(12) United States Patent
Coury et al.

(10) Patent No.: US 12,192,024 B2
(45) Date of Patent: Jan. 7, 2025

(54) SHARED MEMORY

(71) Applicant: Intel Corporation, Santa Clara, CA (US)

(72) Inventors: Bassam N. Coury, Portland, OR (US); Sujoy Sen, Beaverton, OR (US); Thomas E. Willis, Redwood City, CA (US); Durgesh Srivastava, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 700 days.

(21) Appl. No.: 17/103,711

(22) Filed: Nov. 24, 2020

(65) Prior Publication Data

US 2021/0081312 A1    Mar. 18, 2021

Related U.S. Application Data

(60) Provisional application No. 63/115,511, filed on Nov. 18, 2020.

(51) Int. Cl.
*H04L 12/18* (2006.01)
*G06F 12/02* (2006.01)
(Continued)

(52) U.S. Cl.
CPC ...... *H04L 12/1868* (2013.01); *G06F 12/0238* (2013.01); *G06F 12/0813* (2013.01);
(Continued)

(58) Field of Classification Search
CPC . H04L 12/1868; H04L 12/5601; H04L 45/74; H04L 49/201; H04L 67/1095;
(Continued)

(56) References Cited

U.S. PATENT DOCUMENTS 6,331,983 B1    12/2001    Haggerty et al.
6,502,140 B1    12/2002    Boivie
(Continued)

FOREIGN PATENT DOCUMENTS

CN    110401599 A    11/2019
WO    2015021822 A1    2/2015

OTHER PUBLICATIONS

International Search Report and Written Opinion for PCT Patent Application No. PCT/US21/51357, Mailed Jan. 6, 2022, 11 pages.
(Continued)

*Primary Examiner* — Baboucarr Faal
(74) *Attorney, Agent, or Firm* — Compass IP Law PC

(57) ABSTRACT

Examples described herein includes a network interface controller comprising a memory interface and a network interface, the network interface controller configurable to provide access to local memory and remote memory to a requester, wherein the network interface controller is configured with an amount of memory of different memory access speeds for allocation to one or more requesters. In some examples, the network interface controller is to grant or deny a memory allocation request from a requester based on a configuration of an amount of memory for different memory access speeds for allocation to the requester. In some examples, the network interface controller is to grant or deny a memory access request from a requester based on a configuration of memory allocated to the requester. In some examples, the network interface controller is to regulate quality of service of memory access requests from requesters.

20 Claims, 21 Drawing Sheets

(51) Int. Cl.
  *G06F 12/0813* (2016.01)
  *G06F 12/0837* (2016.01)
  *G06F 12/0862* (2016.01)
  *G06F 12/0877* (2016.01)
  *G06F 12/0891* (2016.01)
  *G06F 12/1081* (2016.01)
  *G06F 13/16* (2006.01)
  *G06F 13/28* (2006.01)
  *G06F 13/40* (2006.01)
  *H04L 12/54* (2022.01)
  *H04L 45/74* (2022.01)
  *H04L 49/201* (2022.01)
  *H04L 67/1095* (2022.01)
  *H04L 12/70* (2013.01)

(52) U.S. Cl.
  CPC ...... *G06F 12/0837* (2013.01); *G06F 12/0862* (2013.01); *G06F 12/0877* (2013.01); *G06F 12/0891* (2013.01); *G06F 12/1081* (2013.01); *G06F 13/1689* (2013.01); *G06F 13/28* (2013.01); *G06F 13/4059* (2013.01); *H04L 12/5601* (2013.01); *H04L 45/74* (2013.01); *H04L 49/201* (2013.01); *H04L 67/1095* (2013.01); *G06F 2213/28* (2013.01); *H04L 2012/562* (2013.01)

(58) Field of Classification Search
  CPC ........... H04L 2021/562; G06F 12/0238; G06F 12/0813; G06F 12/0837; G06F 12/0862; G06F 12/0877; G06F 12/0891; G06F 12/1081; G06F 13/1689; G06F 13/28; G06F 13/4059; G06F 2213/28
  See application file for complete search history.

(56) References Cited

U.S. PATENT DOCUMENTS

| | | | |
|---|---|---|---|
| 6,625,121 | B1 | 9/2003 | Lau et al. |
| 6,625,773 | B1 | 9/2003 | Boivie et al. |
| 7,075,904 | B1 | 7/2006 | Manish et al. |
| 7,969,980 | B1 | 6/2011 | Florit et al. |
| 7,987,229 | B1 | 7/2011 | Kinne et al. |
| 9,588,928 | B1 | 3/2017 | Swartzentruber |
| 9,959,227 | B1 | 5/2018 | Diamant et al. |
| 11,231,987 | B1 | 1/2022 | Bose et al. |
| 2001/0021949 | A1 | 9/2001 | Blightman et al. |
| 2002/0041594 | A1 | 4/2002 | Suzuki et al. |
| 2005/0081080 | A1 | 4/2005 | Bender et al. |
| 2005/0216642 | A1 | 9/2005 | Lee |
| 2005/0238035 | A1 | 10/2005 | Riley |
| 2006/0075057 | A1 | 4/2006 | Gildea et al. |
| 2009/0006666 | A1 | 1/2009 | Chen et al. |
| 2011/0035459 | A1 | 2/2011 | Desai et al. |
| 2011/0072234 | A1 | 3/2011 | Chinya et al. |
| 2011/0173396 | A1 | 7/2011 | Sugumar et al. |
| 2013/0232284 | A1 | 9/2013 | Akiyama et al. |
| 2014/0092678 | A1* | 4/2014 | Feekes .................. G06F 12/08 365/163 |
| 2015/0006663 | A1 | 1/2015 | Huang et al. |
| 2015/0092539 | A1 | 4/2015 | Sivabalan et al. |
| 2015/0134891 | A1 | 5/2015 | Jo |
| 2015/0293881 | A1 | 10/2015 | Raikin et al. |
| 2016/0077966 | A1 | 3/2016 | Stabrawa et al. |
| 2016/0267053 | A1 | 9/2016 | Sharp et al. |
| 2017/0041157 | A1 | 2/2017 | Zheng |
| 2018/0176324 | A1 | 6/2018 | Kumar et al. |
| 2018/0181330 | A1 | 6/2018 | Kusters et al. |
| 2018/0239726 | A1 | 8/2018 | Wang et al. |
| 2018/0329841 | A1 | 11/2018 | Maeda |
| 2019/0114102 | A1* | 4/2019 | Chen .................. G06F 3/0604 |
| 2019/0123922 | A1 | 4/2019 | Suthar et al. |
| 2019/0278676 | A1 | 9/2019 | Zou et al. |
| 2019/0313275 | A1* | 10/2019 | Chen .................. H04W 16/10 |
| 2019/0334836 | A1 | 10/2019 | Ajima et al. |
| 2019/0394127 | A1 | 12/2019 | Gerhart et al. |
| 2020/0004685 | A1 | 1/2020 | Bernat et al. |
| 2020/0021492 | A1 | 1/2020 | Ganguli et al. |
| 2020/0042358 | A1 | 2/2020 | Sun et al. |
| 2020/0104275 | A1 | 4/2020 | Sen et al. |
| 2020/0133909 | A1 | 4/2020 | Hefty et al. |
| 2020/0136996 | A1 | 4/2020 | Li et al. |
| 2020/0210360 | A1 | 7/2020 | Reghunath et al. |
| 2020/0296057 | A1 | 9/2020 | Mula et al. |
| 2020/0326889 | A1 | 10/2020 | Norman et al. |
| 2020/0349074 | A1 | 11/2020 | Kucherov et al. |
| 2021/0073151 | A1 | 3/2021 | Sen et al. |
| 2021/0075633 | A1 | 3/2021 | Sen et al. |
| 2021/0374073 | A1 | 12/2021 | Gugnani et al. |
| 2022/0035736 | A1* | 2/2022 | Chiang ................. G06F 3/0679 |

OTHER PUBLICATIONS

Extended European Search Report for Patent Application No. 21196829.2, Mailed Mar. 3, 2022, 7 pages.
"9.2.Performing Direct Memory Access (DMA) transactions", JUNGO Connectivity, WinDriver™ PCI/ISA User's Manual, Version 14.4.0, Chapter 9. Advanced Issues, https://www.jungo.com/st/support/documentation/windriver/14.4.0/wdpci_manual.mhtml/advanced_issues_dma_transaction.html, Copyright 2020 Jungo Connectivity Ltd., 14 pages.
"Chapter 9 Direct Memory Access (DMA)", Oracle, https://docs.oracle.com/cd/E19120-01/open.solaris/819-3196/6n5ed4h06/index.html, @2010 Oracle Corporation, 25 pages.
"Direct Memory Access", ScienceDirect, https://www.sciencedirect.com/topics/computer-science/direct-memory-access, downloaded from the internet Oct. 11, 2022, 17 pages.
"RDMA Aware Networks Programming User Manual Rev 1.7", Mellanox Technoloiges, www.mellanox.com, Jun. 15, 2015, 216 pages.
"Rdma_cm(7)—Linux man page", die.net, https://linux.die.net/man/7/rdma_cm, downloaded from the internet Oct. 11, 2022, 6 pages.
"The GigaIO FabreX Memory Fabric Memory Pooling Overview", GIGAIO Technical Paper, Feb. 2020 | Rev 1.0, 8 pages.
Baker, Art, et al., "Writing a Packet-Based Slave DMA Driver", Oreilly, Windows 200 Device Driver Book: A Guide for Programmers, Second Edition, https://www.oreilly.com/library/view/windows-2000-device/0130204315/0130204315_ch12lev1sec3.html, Nov. 20, 2000, 2 pages.
Deierling, Kevin, "What Is a DPU ?. . . and what's the difference between a DPU, a CPU and a GPU?", NVIDIA, https://blogs.nvidia.com/blog/2020/05/20/whats-a-dpu-data-processing-unit/, May 20, 2020, 5 pages.
Dittia, Zubin D., et al., "DMA Mechanisms for High Performance Network Interfaces", Washington University in St. Louis, Nov. 4, 2007, 15 pages.
Goodwins, Rupert, "How direct memory access speeds Ethernet", ZDNET, https://www.zdnet.com/article/how-direct-memory-access-speeds-ethernet/, May 1, 2003, 3 pages.
Jiang, Dave, "Introducing The Intel® Data Streaming Accelerator (Intel® DSA)", Intel Open Source.org, https://01.org/blogs/2019/introducing-intel-data-streaming-accelerator , Nov. 20, 2019, 6 pages.
Kauffmann, Antoine, et al., "FlexNIC: Rethinking Network DMA", University of Washington, Apr. 20, 2015, 7 pages.
European First Office Action, (EP Exam Report Article 94(3) EPC), for Patent Application No. 21198323.4, Mailed Aug. 2, 2023, 5 pages.
International Search Report and Written Opinion for PCT Patent Application No. PCT/US21/51797, Mailed Jan. 3, 2022, 11 pages.
European First Office Action, (EP Exam Report Article 94(3) EPC), for Patent Application No. 21196829.2, Mailed Oct. 24, 2023, 4 pages.
Extended European Search Report for Patent Application No. 21198323.4, Mailed Mar. 21, 2022, 7 pages.
First Office Action for U.S. Appl. No. 17/103,602, Mailed Jan. 3, 2024, 18 pages.

(56) References Cited

OTHER PUBLICATIONS

First Office Action for U.S. Appl. No. 17/103,674, Mailed Jan. 3, 2024, 16 pages.
MPI, "4.1 Introduction and Overview", https://www.mpi-forum.org/docs/mpi-1.1/mpi-11-html/node64.html, MPI-1.1, Jun. 1995, 4 pages.
First Office Action for U.S. Appl. No. 17/103,781, Mailed Dec. 18, 2023, 19 pages.
Final Office Action for U.S. Appl. No. 17/103,674, Mailed Aug. 14, 2024, 19 pages.
First Office Action for U.S. Appl. No. 17/103,802, Mailed Feb. 15, 2024, 11 pages.
European Second Office Action, (EP Exam Report Article 94(3) EPC), for Patent Application No. 21198323.4, Mailed Sep. 16, 2024, 5 pages.
Extended European Search Report for Patent Application No. 21895303.2, Mailed Sep. 10, 2024, 8 pages.

* cited by examiner

SHARED MEMORY

RELATED APPLICATION

The present application claims the benefit of priority date of U.S. provisional patent application Ser. No. 63/115,511, filed Nov. 18, 2020, the entire disclosure of which is incorporated herein by reference.

DESCRIPTION

Scale-out and distributed architectures increase computing resources or available memory or storage by adding processors, memory, and storage for access using a fabric or network. Disaggregated memory architectures can use pools of memory, located remote from the compute nodes in the system. A memory pool can be shared across a rack or set of racks in a data center. As the memory pools are remote from a compute node, there are additional latencies inherent in their accesses due to latency of packet formation and processing and media traversal across one or more network elements.

DETAILED DESCRIPTION

Figure 1:
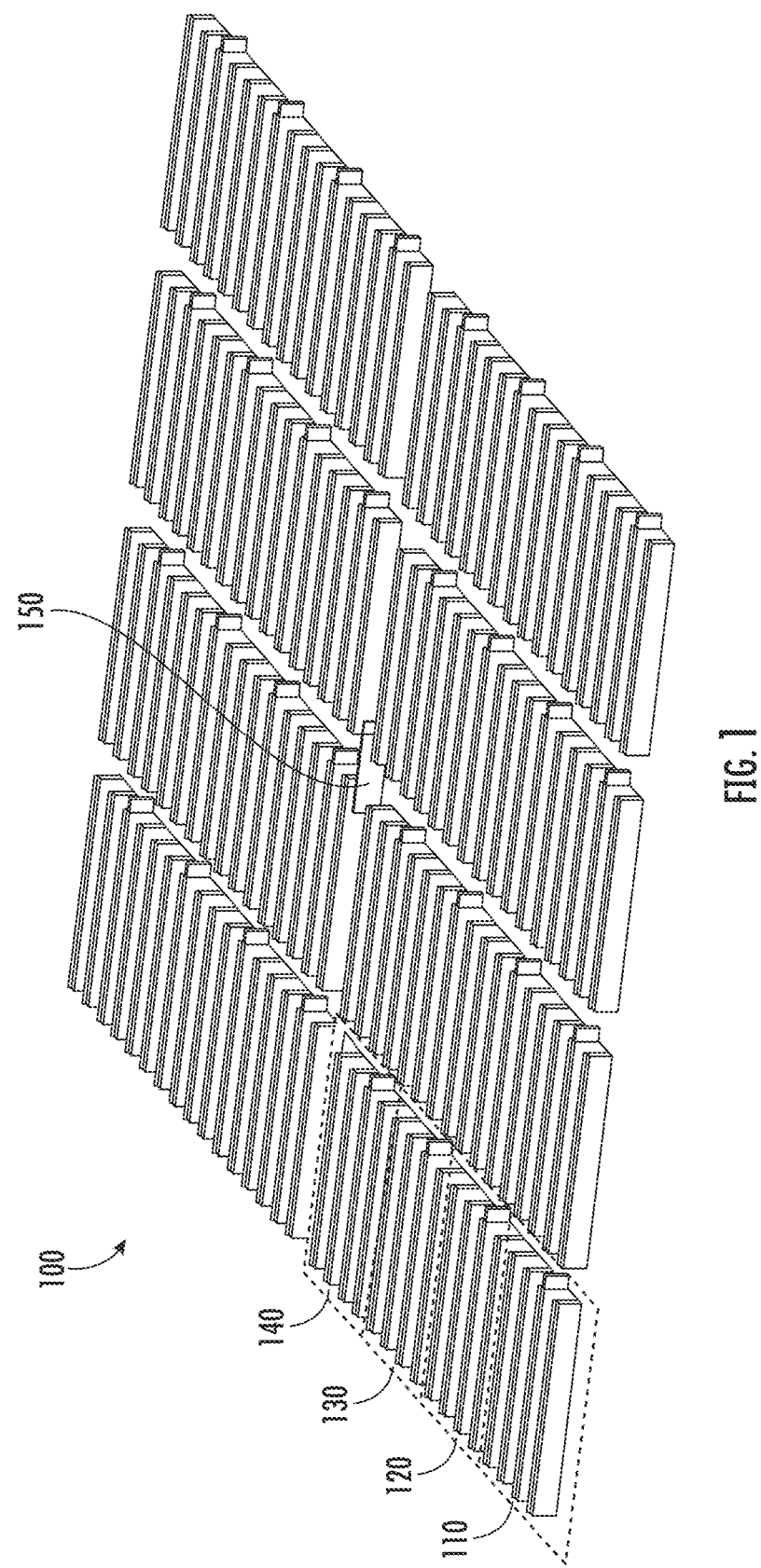
FIG. 1 is a simplified diagram of at least one embodiment of a data center for executing workloads with disaggregated resources.

FIG. 1 depicts a data center in which disaggregated resources may cooperatively execute one or more workloads (e.g., applications on behalf of customers) includes multiple pods 110, 120, 130, 140, a pod being or including one or more rows of racks. Of course, although data center 100 is shown with multiple pods, in some embodiments, the data center 100 may be embodied as a single pod. As described in more detail herein, each rack houses multiple sleds, each of which may be primarily equipped with a particular type of resource (e.g., memory devices, data storage devices, accelerator devices, general purpose processors), e.g., resources that can be logically coupled to form a composed node, which can act as, for example, a server. In the illustrative embodiment, the sleds in each pod 110, 120, 130, 140 are connected to multiple pod switches (e.g., switches that route data communications to and from sleds within the pod). The pod switches, in turn, connect with spine switches 150 that switch communications among pods (e.g., the pods 110, 120, 130, 140) in the data center 100. In some embodiments, the sleds may be connected with a fabric using Intel® Omni-Path technology. In other embodiments, the sleds may be connected with other fabrics, such as InfiniBand or Ethernet. As described in more detail herein, resources within sleds in the data center 100 may be allocated to a group (referred to herein as a "managed node") containing resources from one or more sleds to be collectively utilized in the execution of a workload. The workload can execute as if the resources belonging to the managed node were located on the same sled. The resources in a managed node may belong to sleds belonging to different racks, and even to different pods 110, 120, 130, 140. As such, some resources of a single sled may be allocated to one managed node while other resources of the same sled are allocated to a different managed node (e.g., one processor assigned to one managed node and another processor of the same sled assigned to a different managed node).

A data center comprising disaggregated resources, such as data center 100, can be used in a wide variety of contexts, such as enterprise, government, cloud service provider, and communications service provider (e.g., Telco's), as well in a wide variety of sizes, from cloud service provider megadata centers that consume over 100,000 sq. ft. to single- or multi-rack installations for use in base stations.

The disaggregation of resources to sleds comprised predominantly of a single type of resource (e.g., compute sleds comprising primarily compute resources, memory sleds containing primarily memory resources), and the selective allocation and deallocation of the disaggregated resources to form a managed node assigned to execute a workload improves the operation and resource usage of the data center 100 relative to typical data centers comprised of hyperconverged servers containing compute, memory, storage and perhaps additional resources in a single chassis. For example, because sleds predominantly contain resources of a particular type, resources of a given type can be upgraded independently of other resources. Additionally, because different resources types (processors, storage, accelerators, etc.) typically have different refresh rates, greater resource utilization and reduced total cost of ownership may be achieved. For example, a data center operator can upgrade the processors throughout their facility by only swapping out the compute sleds. In such a case, accelerator and storage resources may not be contemporaneously upgraded and, rather, may be allowed to continue operating until those resources are scheduled for their own refresh. Resource utilization may also increase. For example, if managed nodes are composed based on requirements of the workloads that will be running on them, resources within a node are more likely to be fully utilized. Such utilization may allow for more managed nodes to run in a data center with a given set of resources, or for a data center expected to run a given set of workloads, to be built using fewer resources.

Figure 2:
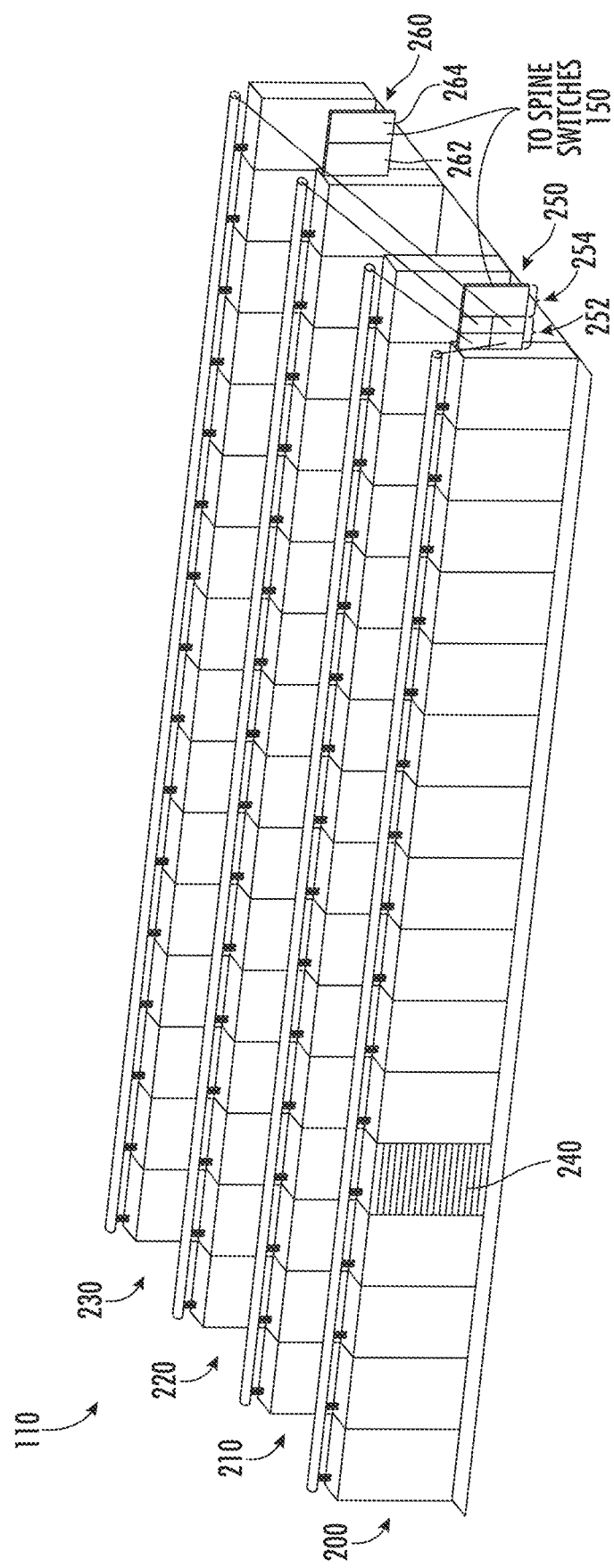
FIG. 2 is a simplified diagram of at least one embodiment of a pod that may be included in a data center.

FIG. 2 depicts a pod. A pod can include a set of rows 200, 210, 220, 230 of racks 240. Each rack 240 may house multiple sleds (e.g., sixteen sleds) and provide power and data connections to the housed sleds, as described in more detail herein. In the illustrative embodiment, the racks in each row 200, 210, 220, 230 are connected to multiple pod switches 250, 260. The pod switch 250 includes a set of ports 252 to which the sleds of the racks of the pod 110 are connected and another set of ports 254 that connect the pod 110 to the spine switches 150 to provide connectivity to other pods in the data center 100. Similarly, the pod switch 260 includes a set of ports 262 to which the sleds of the racks of the pod 110 are connected and a set of ports 264 that connect the pod 110 to the spine switches 150. As such, the use of the pair of switches 250, 260 provides an amount of redundancy to the pod 110. For example, if either of the switches 250, 260 fails, the sleds in the pod 110 may still maintain data communication with the remainder of the data center 100 (e.g., sleds of other pods) through the other switch 250, 260. Furthermore, in the illustrative embodiment, the switches 150, 250, 260 may be embodied as dual-mode optical switches, capable of routing both Ethernet protocol communications carrying Internet Protocol (IP) packets and communications according to a second, high-performance link-layer protocol (e.g., PCI Express) via optical signaling media of an optical fabric.

It should be appreciated that each of the other pods 120, 130, 140 (as well as any additional pods of the data center 100) may be similarly structured as, and have components similar to, the pod 110 shown in and described in regard to FIG. 2 (e.g., each pod may have rows of racks housing multiple sleds as described above). Additionally, while two pod switches 250, 260 are shown, it should be understood that in other embodiments, each pod 110, 120, 130, 140 may be connected to a different number of pod switches, providing even more failover capacity. Of course, in other embodiments, pods may be arranged differently than the rows-of-racks configuration shown in FIGS. 1-2. For example, a pod may be embodied as multiple sets of racks in which each set of racks is arranged radially, e.g., the racks are equidistant from a center switch.

Figure 3:
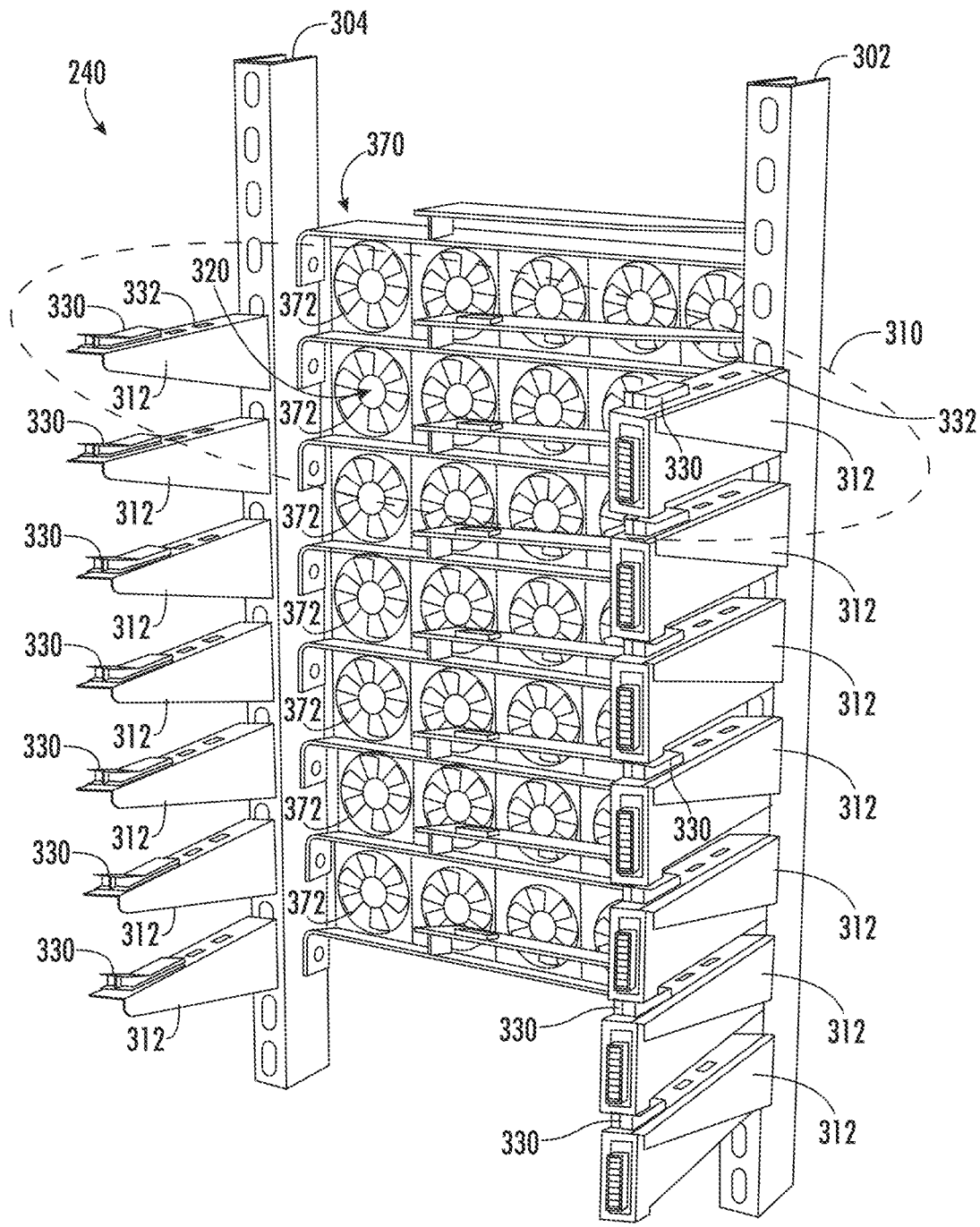
FIG. 3 is a perspective view of at least one embodiment of a rack that may be included in a pod.
Figure 4:
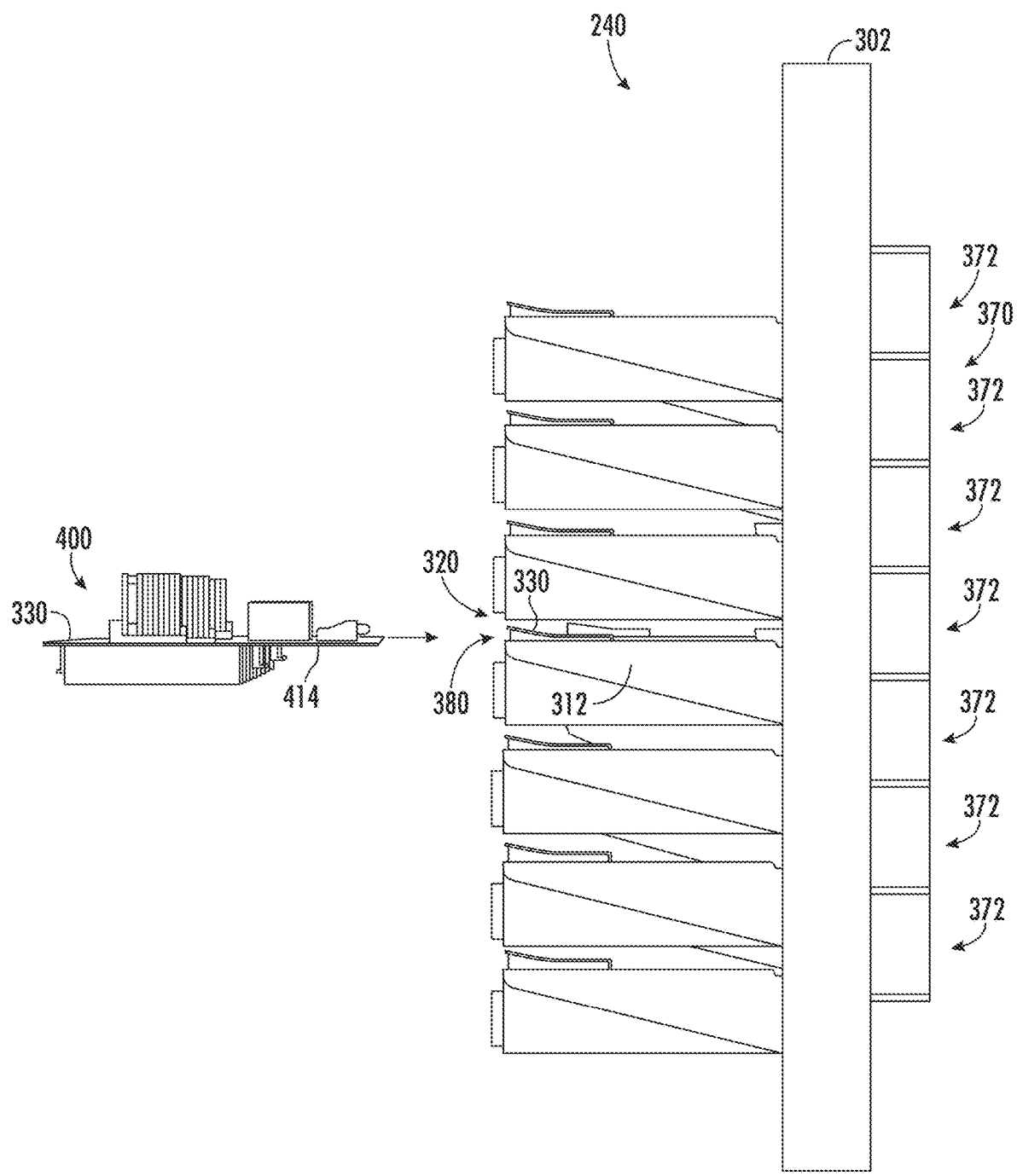
FIG. 4 is a side elevation view of a rack.
Figure 5:
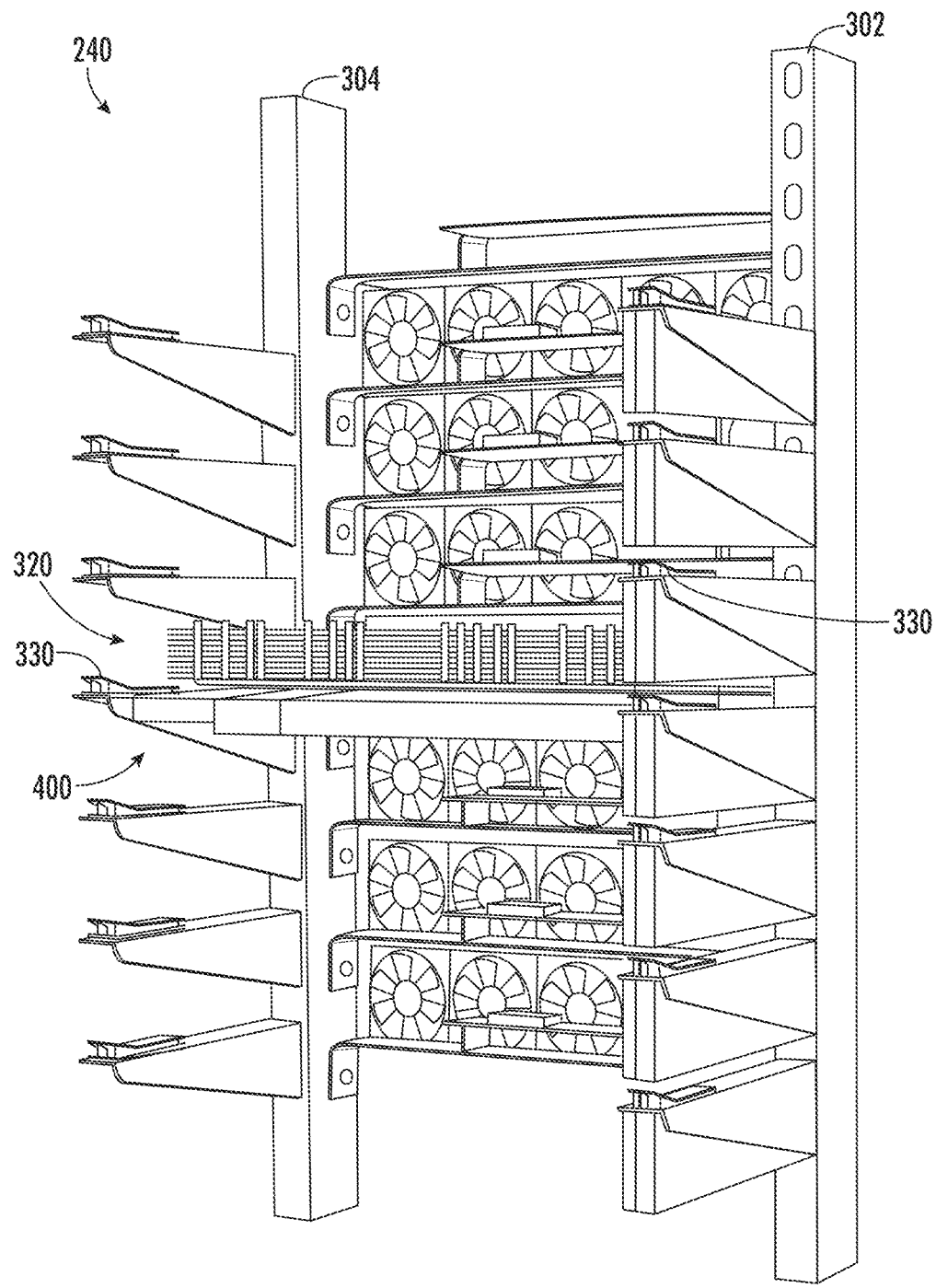
FIG. 5 is a perspective view of a rack having a sled mounted therein.

Referring now to FIGS. 3-5, each illustrative rack 240 of the data center 100 includes two elongated support posts 302, 304, which are arranged vertically. For example, the elongated support posts 302, 304 may extend upwardly from a floor of the data center 100 when deployed. The rack 240 also includes one or more horizontal pairs 310 of elongated support arms 312 (identified in FIG. 3 via a dashed ellipse) configured to support a sled of the data center 100 as discussed below. One elongated support arm 312 of the pair of elongated support arms 312 extends outwardly from the elongated support post 302 and the other elongated support arm 312 extends outwardly from the elongated support post 304.

In the illustrative embodiments, each sled of the data center 100 is embodied as a chassis-less sled. That is, each sled has a chassis-less circuit board substrate on which physical resources (e.g., processors, memory, accelerators, storage, etc.) are mounted as discussed in more detail below. As such, the rack 240 is configured to receive the chassis-less sleds. For example, each pair 310 of elongated support arms 312 defines a sled slot 320 of the rack 240, which is configured to receive a corresponding chassis-less sled. To do so, each illustrative elongated support arm 312 includes a circuit board guide 330 configured to receive the chassis-less circuit board substrate of the sled. Each circuit board guide 330 is secured to, or otherwise mounted to, a top side 332 of the corresponding elongated support arm 312. For example, in the illustrative embodiment, each circuit board guide 330 is mounted at a distal end of the corresponding elongated support arm 312 relative to the corresponding elongated support post 302, 304. For clarity of the Figures, not every circuit board guide 330 may be referenced in each Figure.

Each circuit board guide 330 includes an inner wall that defines a circuit board slot 380 configured to receive the chassis-less circuit board substrate of a sled 400 when the sled 400 is received in the corresponding sled slot 320 of the rack 240. To do so, as shown in FIG. 4, a user (or robot) aligns the chassis-less circuit board substrate of an illustrative chassis-less sled 400 to a sled slot 320. The user, or robot, may then slide the chassis-less circuit board substrate forward into the sled slot 320 such that each side edge 414 of the chassis-less circuit board substrate is received in a corresponding circuit board slot 380 of the circuit board guides 330 of the pair 310 of elongated support arms 312 that define the corresponding sled slot 320 as shown in FIG. 4. By having robotically accessible and robotically manipulatable sleds comprising disaggregated resources, each type of resource can be upgraded independently of each other and at their own optimized refresh rate. Furthermore, the sleds are configured to blindly mate with power and data communication cables in each rack 240, enhancing their ability to be quickly removed, upgraded, reinstalled, and/or replaced. As such, in some embodiments, the data center 100 may operate (e.g., execute workloads, undergo maintenance and/or upgrades, etc.) without human involvement on the data center floor. In other embodiments, a human may facilitate one or more maintenance or upgrade operations in the data center 100.

It should be appreciated that each circuit board guide 330 is dual sided. That is, each circuit board guide 330 includes an inner wall that defines a circuit board slot 380 on each side of the circuit board guide 330. In this way, each circuit board guide 330 can support a chassis-less circuit board substrate on either side. As such, a single additional elongated support post may be added to the rack 240 to turn the rack 240 into a two-rack solution that can hold twice as many sled slots 320 as shown in FIG. 3. The illustrative rack 240 includes seven pairs 310 of elongated support arms 312 that define a corresponding seven sled slots 320, each configured to receive and support a corresponding sled 400 as discussed above. Of course, in other embodiments, the rack 240 may include additional or fewer pairs 310 of elongated support arms 312 (e.g., additional or fewer sled slots 320). It should be appreciated that because the sled 400 is chassis-less, the sled 400 may have an overall height that is different than typical servers. As such, in some embodiments, the height of each sled slot 320 may be shorter than the height of a typical server (e.g., shorter than a single rank unit, "1U"). That is, the vertical distance between each pair 310 of elongated support arms 312 may be less than a standard rack unit "1U." Additionally, due to the relative decrease in height of the sled slots 320, the overall height of the rack 240 in some embodiments may be shorter than the height of traditional rack enclosures. For example, in some embodiments, each of the elongated support posts 302, 304 may have a length of six feet or less. Again, in other embodiments, the rack 240 may have different dimensions. For example, in some embodiments, the vertical distance between each pair 310 of elongated support arms 312 may be greater than a standard rack until "1U". In such embodiments, the increased vertical distance between the sleds allows for larger heat sinks to be attached to the physical resources and for larger fans to be used (e.g., in the fan array 370 described below) for cooling each sled, which in turn can allow the physical resources to operate at increased power levels. Further, it should be appreciated that the rack 240 does not include any walls, enclosures, or the like. Rather, the rack 240 is an enclosure-less rack that is opened to the local environment. Of course, in some cases, an end plate may be attached to one of the elongated support posts 302, 304 in those situations in which the rack 240 forms an end-of-row rack in the data center 100.

In some embodiments, various interconnects may be routed upwardly or downwardly through the elongated support posts 302, 304. To facilitate such routing, each elongated support post 302, 304 includes an inner wall that defines an inner chamber in which interconnects may be located. The interconnects routed through the elongated support posts 302, 304 may be embodied as any type of interconnects including, but not limited to, data or communication interconnects to provide communication connections to each sled slot 320, power interconnects to provide power to each sled slot 320, and/or other types of interconnects.

The rack 240, in the illustrative embodiment, includes a support platform on which a corresponding optical data connector (not shown) is mounted. Each optical data connector is associated with a corresponding sled slot 320 and is configured to mate with an optical data connector of a corresponding sled 400 when the sled 400 is received in the corresponding sled slot 320. In some embodiments, optical connections between components (e.g., sleds, racks, and switches) in the data center 100 are made with a blind mate optical connection. For example, a door on each cable may prevent dust from contaminating the fiber inside the cable. In the process of connecting to a blind mate optical connector mechanism, the door is pushed open when the end of the cable approaches or enters the connector mechanism. Subsequently, the optical fiber inside the cable may enter a gel within the connector mechanism and the optical fiber of one cable comes into contact with the optical fiber of another cable within the gel inside the connector mechanism.

The illustrative rack 240 also includes a fan array 370 coupled to the cross-support arms of the rack 240. The fan array 370 includes one or more rows of cooling fans 372, which are aligned in a horizontal line between the elongated support posts 302, 304. In the illustrative embodiment, the fan array 370 includes a row of cooling fans 372 for each sled slot 320 of the rack 240. As discussed above, each sled 400 does not include any on-board cooling system in the illustrative embodiment and, as such, the fan array 370 provides cooling for each sled 400 received in the rack 240. Each rack 240, in the illustrative embodiment, also includes a power supply associated with each sled slot 320. Each power supply is secured to one of the elongated support arms 312 of the pair 310 of elongated support arms 312 that define the corresponding sled slot 320. For example, the rack 240 may include a power supply coupled or secured to each elongated support arm 312 extending from the elongated support post 302. Each power supply includes a power connector configured to mate with a power connector of the sled 400 when the sled 400 is received in the corresponding sled slot 320. In the illustrative embodiment, the sled 400 does not include any on-board power supply and, as such, the power supplies provided in the rack 240 supply power to corresponding sleds 400 when mounted to the rack 240. Each power supply is configured to satisfy the power requirements for its associated sled, which can vary from sled to sled. Additionally, the power supplies provided in the rack 240 can operate independent of each other. That is, within a single rack, a first power supply providing power to a compute sled can provide power levels that are different than power levels supplied by a second power supply providing power to an accelerator sled. The power supplies may be controllable at the sled level or rack level, and may be controlled locally by components on the associated sled or remotely, such as by another sled or an orchestrator.

Figure 6:
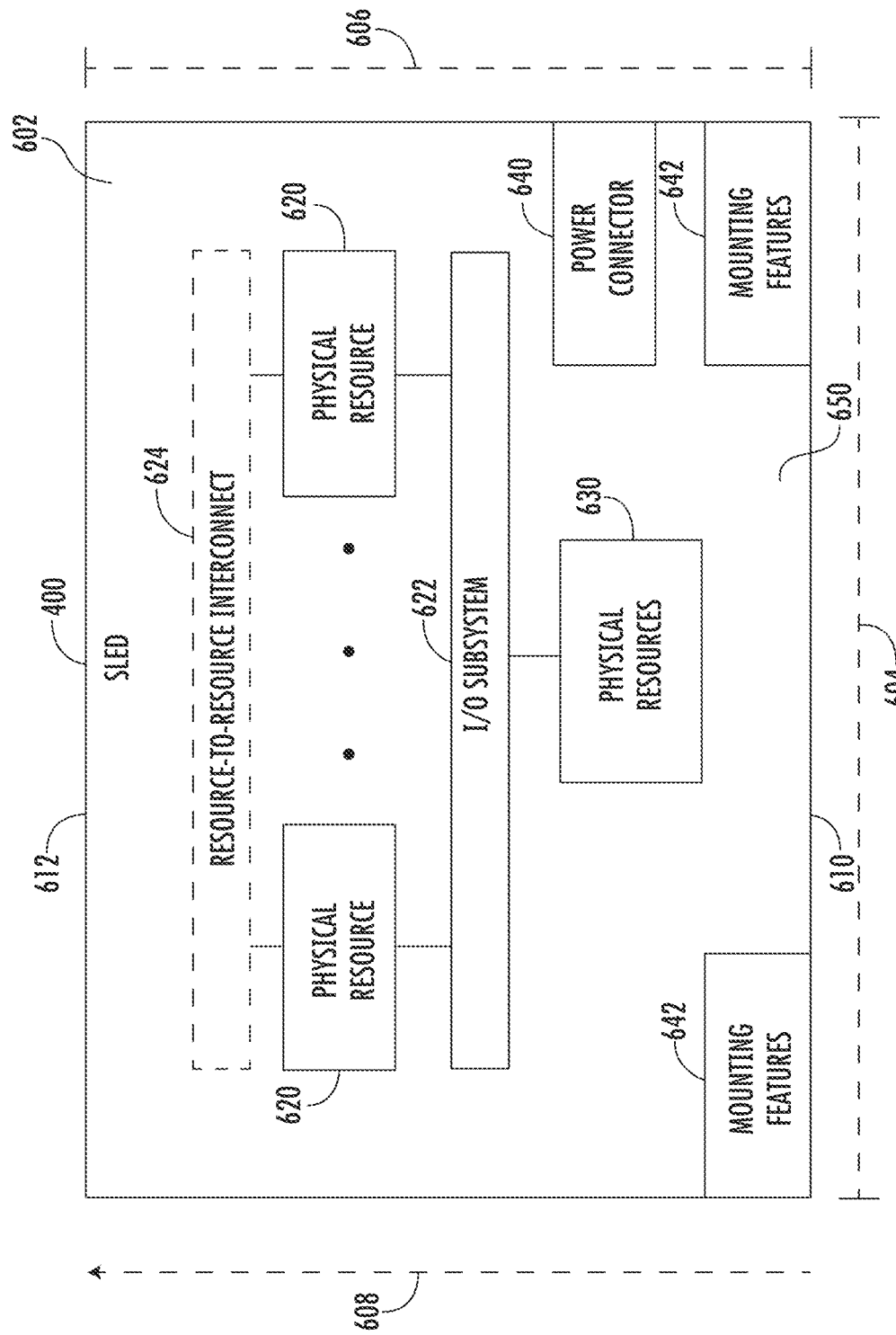
FIG. 6 is a simplified block diagram of at least one embodiment of a top side of a sled.

Referring now to FIG. 6, the sled 400, in the illustrative embodiment, is configured to be mounted in a corresponding rack 240 of the data center 100 as discussed above. In some embodiments, each sled 400 may be optimized or otherwise configured for performing particular tasks, such as compute tasks, acceleration tasks, data storage tasks, etc. For example, the sled 400 may be embodied as a compute sled 800 as discussed below in regard to FIGS. 8-9, an accelerator sled 1000 as discussed below in regard to FIGS. 10-11, a storage sled 1200 as discussed below in regard to FIGS. 12-13, or as a sled optimized or otherwise configured to perform other specialized tasks, such as a memory sled 1400, discussed below in regard to FIG. 14.

As discussed above, the illustrative sled 400 includes a chassis-less circuit board substrate 602, which supports various physical resources (e.g., electrical components) mounted thereon. It should be appreciated that the circuit board substrate 602 is "chassis-less" in that the sled 400 does not include a housing or enclosure. Rather, the chassis-less circuit board substrate 602 is open to the local environment. The chassis-less circuit board substrate 602 may be formed from any material capable of supporting the various electrical components mounted thereon. For example, in an illustrative embodiment, the chassis-less circuit board substrate 602 is formed from an FR-4 glass-reinforced epoxy laminate material. Of course, other materials may be used to form the chassis-less circuit board substrate 602 in other embodiments.

As discussed in more detail below, the chassis-less circuit board substrate 602 includes multiple features that improve the thermal cooling characteristics of the various electrical components mounted on the chassis-less circuit board substrate 602. As discussed, the chassis-less circuit board substrate 602 does not include a housing or enclosure, which may improve the airflow over the electrical components of the sled 400 by reducing those structures that may inhibit air flow. For example, because the chassis-less circuit board substrate 602 is not positioned in an individual housing or enclosure, there is no vertically-arranged backplane (e.g., a backplate of the chassis) attached to the chassis-less circuit board substrate 602, which could inhibit air flow across the electrical components. Additionally, the chassis-less circuit board substrate 602 has a geometric shape configured to reduce the length of the airflow path across the electrical components mounted to the chassis-less circuit board substrate 602. For example, the illustrative chassis-less circuit board substrate 602 has a width 604 that is greater than a depth 606 of the chassis-less circuit board substrate 602. In one particular embodiment, for example, the chassis-less circuit board substrate 602 has a width of about 21 inches and a depth of about 9 inches, compared to a typical server that has a width of about 17 inches and a depth of about 39 inches. As such, an airflow path 608 that extends from a front edge 610 of the chassis-less circuit board substrate 602 toward a rear edge 612 has a shorter distance relative to typical servers, which may improve the thermal cooling characteristics of the sled 400. Furthermore, although not illustrated in FIG. 6, the various physical resources mounted to the chassis-less circuit board substrate 602 are mounted in corresponding locations such that no two substantively heat-producing electrical components shadow each other as discussed in more detail below. That is, no two electrical components, which produce appreciable heat during operation (e.g., greater than a nominal heat sufficient enough to adversely impact the cooling of another electrical component), are mounted to the chassis-less circuit board substrate 602 linearly in-line with each other along the direction of the airflow path 608 (e.g., along a direction extending from the front edge 610 toward the rear edge 612 of the chassis-less circuit board substrate 602).

As discussed above, the illustrative sled 400 includes one or more physical resources 620 mounted to a top side 650 of the chassis-less circuit board substrate 602. Although two physical resources 620 are shown in FIG. 6, it should be appreciated that the sled 400 may include one, two, or more physical resources 620 in other embodiments. The physical resources 620 may be embodied as any type of processor, controller, or other compute circuit capable of performing various tasks such as compute functions and/or controlling the functions of the sled 400 depending on, for example, the type or intended functionality of the sled 400. For example, as discussed in more detail below, the physical resources 620 may be embodied as high-performance processors in embodiments in which the sled 400 is embodied as a compute sled, as accelerator co-processors or circuits in embodiments in which the sled 400 is embodied as an accelerator sled, storage controllers in embodiments in which the sled 400 is embodied as a storage sled, or a set of memory devices in embodiments in which the sled 400 is embodied as a memory sled.

The sled 400 also includes one or more additional physical resources 630 mounted to the top side 650 of the chassis-less circuit board substrate 602. In the illustrative embodiment, the additional physical resources include a network interface controller (NIC) as discussed in more detail below. Of course, depending on the type and functionality of the sled 400, the physical resources 630 may include additional or other electrical components, circuits, and/or devices in other embodiments.

The physical resources 620 are communicatively coupled to the physical resources 630 via an input/output (I/O) subsystem 622. The I/O subsystem 622 may be embodied as circuitry and/or components to facilitate input/output operations with the physical resources 620, the physical resources 630, and/or other components of the sled 400. For example, the I/O subsystem 622 may be embodied as, or otherwise include, memory controller hubs, input/output control hubs, integrated sensor hubs, firmware devices, communication links (e.g., point-to-point links, bus links, wires, cables, waveguides, light guides, printed circuit board traces, etc.), and/or other components and subsystems to facilitate the input/output operations. In the illustrative embodiment, the I/O subsystem 622 is embodied as, or otherwise includes, a double data rate 4 (DDR4) data bus or a DDR5 data bus.

In some embodiments, the sled 400 may also include a resource-to-resource interconnect 624. The resource-to-resource interconnect 624 may be embodied as any type of communication interconnect capable of facilitating resource-to-resource communications. In the illustrative embodiment, the resource-to-resource interconnect 624 is embodied as a high-speed point-to-point interconnect (e.g., faster than the I/O subsystem 622). For example, the resource-to-resource interconnect 624 may be embodied as a QuickPath Interconnect (QPI), an UltraPath Interconnect (UPI), PCI express (PCIe), or other high-speed point-to-point interconnect dedicated to resource-to-resource communications.

The sled 400 also includes a power connector 640 configured to mate with a corresponding power connector of the rack 240 when the sled 400 is mounted in the corresponding rack 240. The sled 400 receives power from a power supply of the rack 240 via the power connector 640 to supply power to the various electrical components of the sled 400. That is, the sled 400 does not include any local power supply (e.g., an on-board power supply) to provide power to the electrical components of the sled 400. The exclusion of a local or on-board power supply facilitates the reduction in the overall footprint of the chassis-less circuit board substrate 602, which may increase the thermal cooling characteristics of the various electrical components mounted on the chassis-less circuit board substrate 602 as discussed above. In some embodiments, voltage regulators are placed on a bottom side 750 (see FIG. 7) of the chassis-less circuit board substrate 602 directly opposite of the processors 820 (see FIG. 8), and power is routed from the voltage regulators to the processors 820 by vias extending through the circuit board substrate 602. Such a configuration provides an increased thermal budget, additional current and/or voltage, and better voltage control relative to typical printed circuit boards in which processor power is delivered from a voltage regulator, in part, by printed circuit traces.

In some embodiments, the sled 400 may also include mounting features 642 configured to mate with a mounting arm, or other structure, of a robot to facilitate the placement of the sled 600 in a rack 240 by the robot. The mounting features 642 may be embodied as any type of physical structures that allow the robot to grasp the sled 400 without damaging the chassis-less circuit board substrate 602 or the electrical components mounted thereto. For example, in some embodiments, the mounting features 642 may be embodied as non-conductive pads attached to the chassis-less circuit board substrate 602. In other embodiments, the mounting features may be embodied as brackets, braces, or other similar structures attached to the chassis-less circuit board substrate 602. The particular number, shape, size, and/or make-up of the mounting feature 642 may depend on the design of the robot configured to manage the sled 400.

Figure 7:
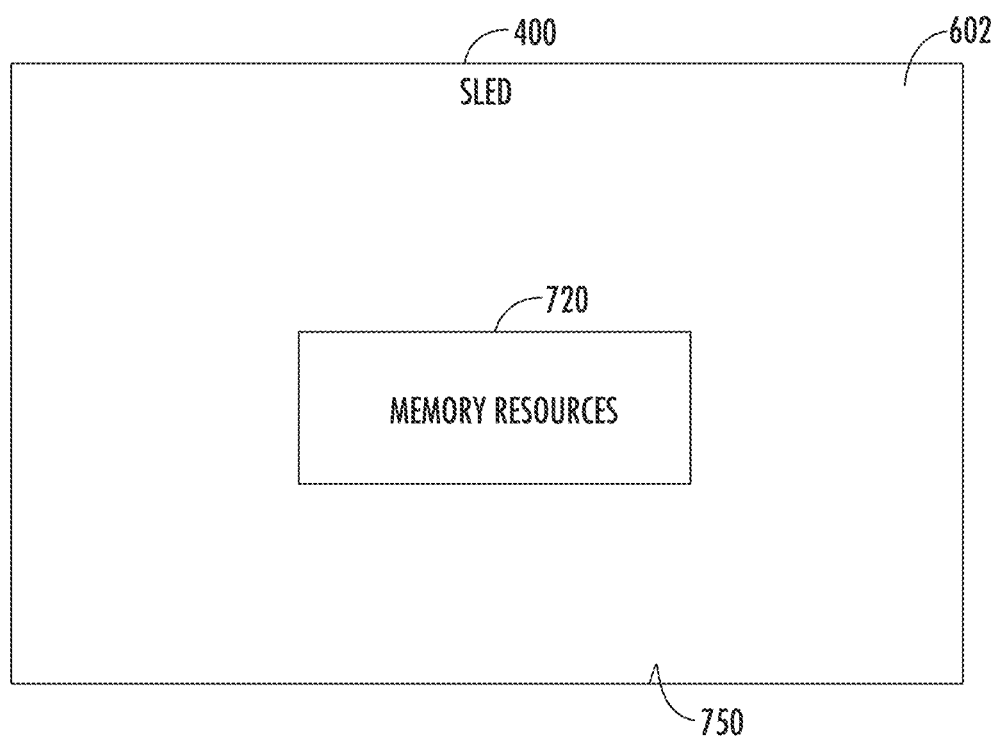
FIG. 7 is a simplified block diagram of at least one embodiment of a bottom side of a sled.

Referring now to FIG. 7, in addition to the physical resources 630 mounted on the top side 650 of the chassis-less circuit board substrate 602, the sled 400 also includes one or more memory devices 720 mounted to a bottom side 750 of the chassis-less circuit board substrate 602. That is, the chassis-less circuit board substrate 602 is embodied as a double-sided circuit board. The physical resources 620 are communicatively coupled to the memory devices 720 via the I/O subsystem 622. For example, the physical resources 620 and the memory devices 720 may be communicatively coupled by one or more vias extending through the chassis-less circuit board substrate 602. Each physical resource 620 may be communicatively coupled to a different set of one or more memory devices 720 in some embodiments. Alternatively, in other embodiments, each physical resource 620 may be communicatively coupled to each memory device 720.

The memory devices 720 may be embodied as any type of memory device capable of storing data for the physical resources 620 during operation of the sled 400, such as any type of volatile (e.g., dynamic random access memory (DRAM), etc.) or non-volatile memory. Volatile memory may be a storage medium that requires power to maintain the state of data stored by the medium. Non-limiting examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces.

In one embodiment, the memory device is a block addressable memory device, such as those based on NAND or NOR technologies. A block can be any size such as but not limited to 2 KB, 4 KB, 8 KB, and so forth. A memory device may also include next-generation nonvolatile devices, such as Intel Optane® memory or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product. In some embodiments, the memory device may comprise a transistor-less stackable cross point architecture in which memory cells sit at the intersection of word lines and bit lines and are individually addressable and in which bit storage is based on a change in bulk resistance.

Figure 8:
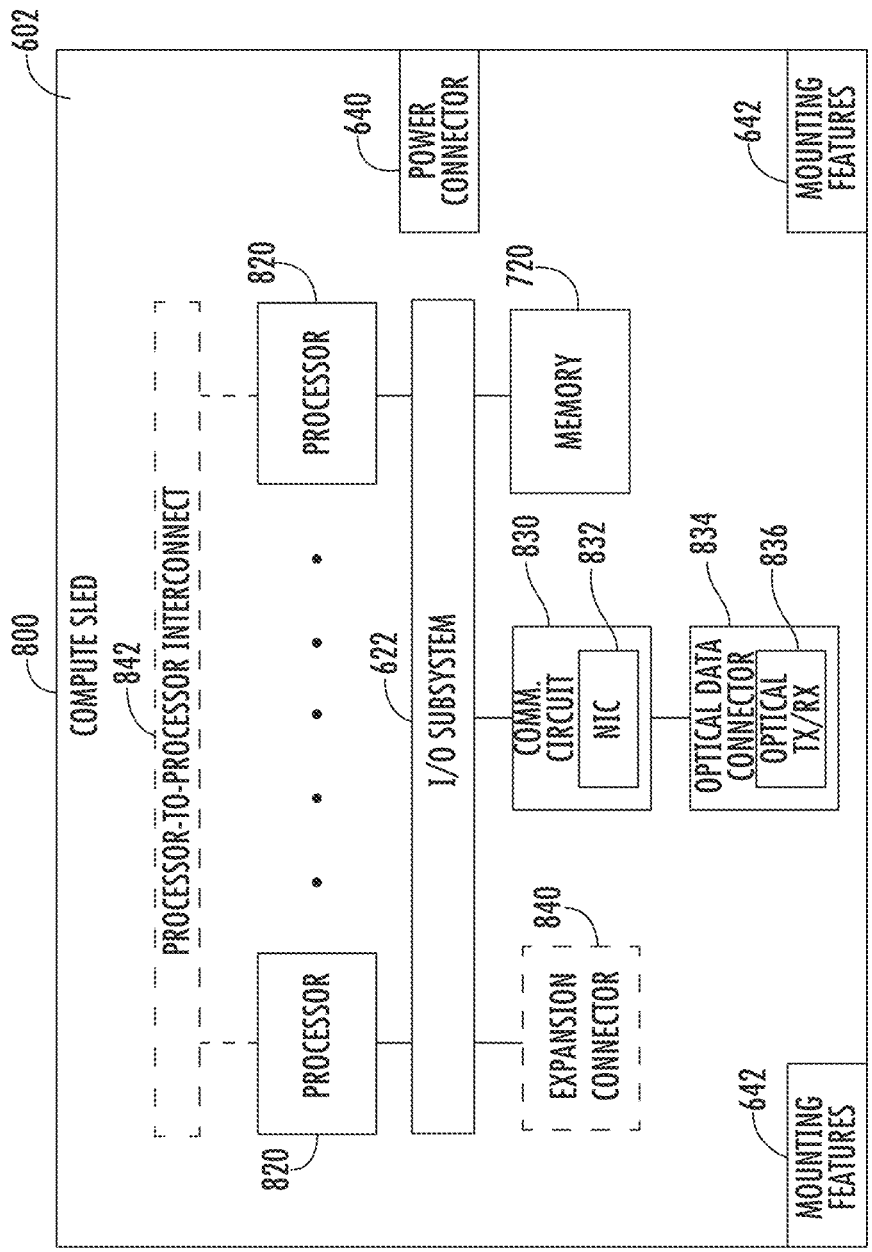
FIG. 8 is a simplified block diagram of at least one embodiment of a compute sled.

Referring now to FIG. 8, in some embodiments, the sled 400 may be embodied as a compute sled 800. The compute sled 800 is optimized, or otherwise configured, to perform compute tasks. Of course, as discussed above, the compute sled 800 may rely on other sleds, such as acceleration sleds and/or storage sleds, to perform such compute tasks. The compute sled 800 includes various physical resources (e.g., electrical components) similar to the physical resources of the sled 400, which have been identified in FIG. 8 using the same reference numbers. The description of such components provided above in regard to FIGS. 6 and 7 applies to the corresponding components of the compute sled 800 and is not repeated herein for clarity of the description of the compute sled 800.

In the illustrative compute sled 800, the physical resources 620 are embodied as processors 820. Although only two processors 820 are shown in FIG. 8, it should be appreciated that the compute sled 800 may include additional processors 820 in other embodiments. Illustratively, the processors 820 are embodied as high-performance processors 820 and may be configured to operate at a relatively high power rating. Although the processors 820 generate additional heat operating at power ratings greater than typical processors (which operate at around 155-230 W), the enhanced thermal cooling characteristics of the chassis-less circuit board substrate 602 discussed above facilitate the higher power operation. For example, in the illustrative embodiment, the processors 820 are configured to operate at a power rating of at least 250 W. In some embodiments, the processors 820 may be configured to operate at a power rating of at least 350 W.

In some embodiments, the compute sled 800 may also include a processor-to-processor interconnect 842. Similar to the resource-to-resource interconnect 624 of the sled 400 discussed above, the processor-to-processor interconnect 842 may be embodied as any type of communication interconnect capable of facilitating processor-to-processor interconnect 842 communications. In the illustrative embodiment, the processor-to-processor interconnect 842 is embodied as a high-speed point-to-point interconnect (e.g., faster than the I/O subsystem 622). For example, the processor-to-processor interconnect 842 may be embodied as a QuickPath Interconnect (QPI), an UltraPath Interconnect (UPI), or other high-speed point-to-point interconnect dedicated to processor-to-processor communications (e.g., PCIe).

The compute sled 800 also includes a communication circuit 830. The illustrative communication circuit 830 includes a network interface controller (NIC) 832, which may also be referred to as a host fabric interface (HFI). The NIC 832 may be embodied as, or otherwise include, any type of integrated circuit, discrete circuits, controller chips, chipsets, add-in-boards, daughtercards, network interface cards, or other devices that may be used by the compute sled 800 to connect with another compute device (e.g., with other sleds 400). In some embodiments, the NIC 832 may be embodied as part of a system-on-a-chip (SoC) that includes one or more processors, or included on a multichip package that also contains one or more processors. In some embodiments, the NIC 832 may include a local processor (not shown) and/or a local memory (not shown) that are both local to the NIC 832. In such embodiments, the local processor of the NIC 832 may be capable of performing one or more of the functions of the processors 820. Additionally or alternatively, in such embodiments, the local memory of the NIC 832 may be integrated into one or more components of the compute sled at the board level, socket level, chip level, and/or other levels. In some examples, a network interface includes a network interface controller or a network interface card. In some examples, a network interface can include one or more of a network interface controller (NIC) 832, a host fabric interface (HFI), a host bus adapter (HBA), network interface connected to a bus or connection (e.g., PCIe, CXL, DDR, and so forth). In some examples, a network interface can be part of a switch or a system-on-chip (SoC).

The communication circuit 830 is communicatively coupled to an optical data connector 834. The optical data connector 834 is configured to mate with a corresponding optical data connector of the rack 240 when the compute sled 800 is mounted in the rack 240. Illustratively, the optical data connector 834 includes a plurality of optical fibers which lead from a mating surface of the optical data connector 834 to an optical transceiver 836. The optical transceiver 836 is configured to convert incoming optical signals from the rack-side optical data connector to electrical signals and to convert electrical signals to outgoing optical signals to the rack-side optical data connector. Although shown as forming part of the optical data connector 834 in the illustrative embodiment, the optical transceiver 836 may form a portion of the communication circuit 830 in other embodiments.

In some embodiments, the compute sled 800 may also include an expansion connector 840. In such embodiments, the expansion connector 840 is configured to mate with a corresponding connector of an expansion chassis-less circuit board substrate to provide additional physical resources to the compute sled 800. The additional physical resources may be used, for example, by the processors 820 during operation of the compute sled 800. The expansion chassis-less circuit board substrate may be substantially similar to the chassis-less circuit board substrate 602 discussed above and may include various electrical components mounted thereto. The particular electrical components mounted to the expansion chassis-less circuit board substrate may depend on the intended functionality of the expansion chassis-less circuit board substrate. For example, the expansion chassis-less circuit board substrate may provide additional compute resources, memory resources, and/or storage resources. As such, the additional physical resources of the expansion chassis-less circuit board substrate may include, but is not limited to, processors, memory devices, storage devices, and/or accelerator circuits including, for example, field programmable gate arrays (FPGA), application-specific integrated circuits (ASICs), security co-processors, graphics processing units (GPUs), machine learning circuits, or other specialized processors, controllers, devices, and/or circuits.

Figure 9:
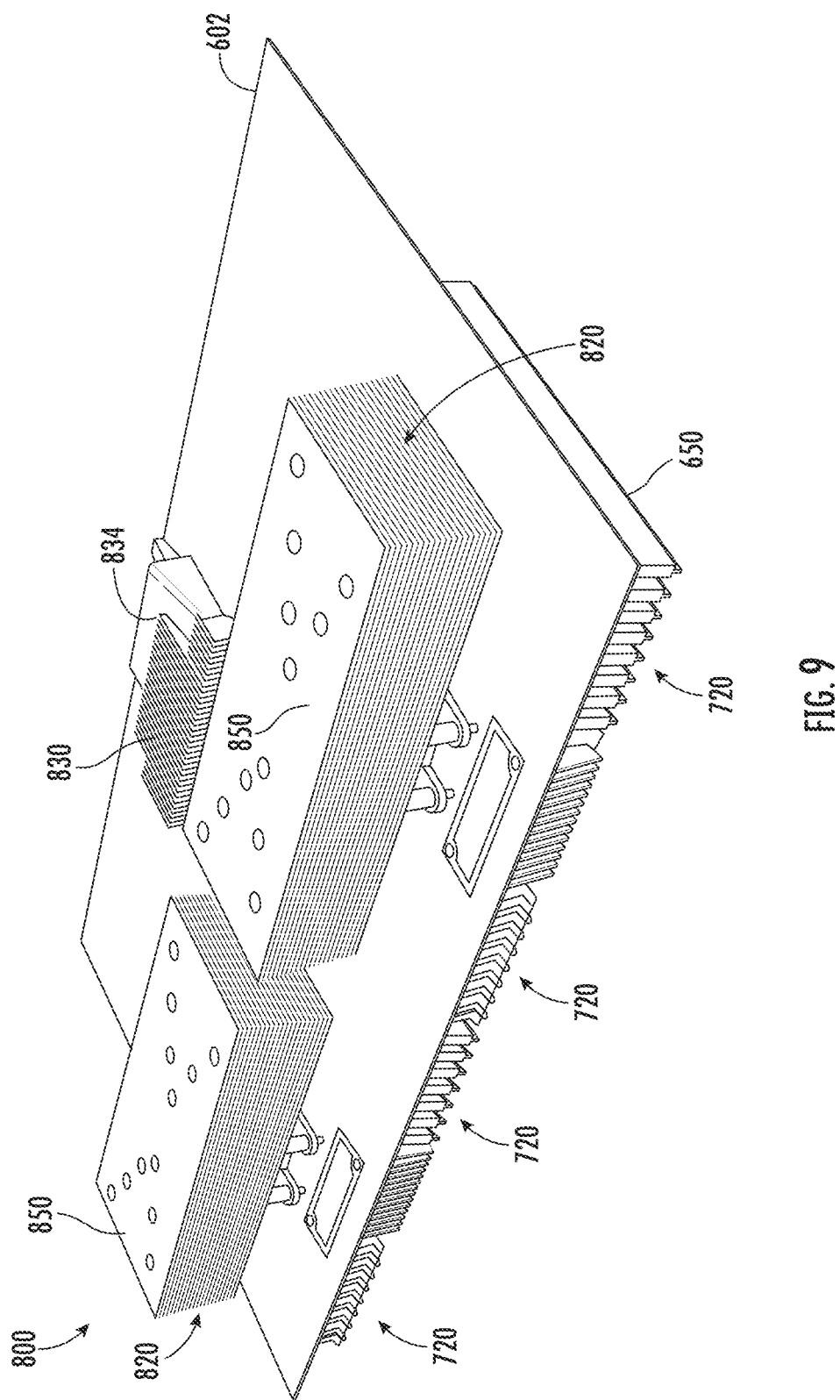
FIG. 9 is a top perspective view of at least one embodiment of a compute sled.

Referring now to FIG. 9, an illustrative embodiment of the compute sled 800 is shown. As shown, the processors 820, communication circuit 830, and optical data connector 834 are mounted to the top side 650 of the chassis-less circuit board substrate 602. Any suitable attachment or mounting technology may be used to mount the physical resources of the compute sled 800 to the chassis-less circuit board substrate 602. For example, the various physical resources may be mounted in corresponding sockets (e.g., a processor socket), holders, or brackets. In some cases, some of the electrical components may be directly mounted to the chassis-less circuit board substrate 602 via soldering or similar techniques.

As discussed above, the individual processors 820 and communication circuit 830 are mounted to the top side 650 of the chassis-less circuit board substrate 602 such that no two heat-producing, electrical components shadow each other. In the illustrative embodiment, the processors 820 and communication circuit 830 are mounted in corresponding locations on the top side 650 of the chassis-less circuit board substrate 602 such that no two of those physical resources are linearly in-line with others along the direction of the airflow path 608. It should be appreciated that, although the optical data connector 834 is in-line with the communication circuit 830, the optical data connector 834 produces no or nominal heat during operation.

The memory devices 720 of the compute sled 800 are mounted to the bottom side 750 of the of the chassis-less circuit board substrate 602 as discussed above in regard to the sled 400. Although mounted to the bottom side 750, the memory devices 720 are communicatively coupled to the processors 820 located on the top side 650 via the I/O subsystem 622. Because the chassis-less circuit board substrate 602 is embodied as a double-sided circuit board, the memory devices 720 and the processors 820 may be communicatively coupled by one or more vias, connectors, or other mechanisms extending through the chassis-less circuit board substrate 602. Of course, each processor 820 may be communicatively coupled to a different set of one or more memory devices 720 in some embodiments. Alternatively, in other embodiments, each processor 820 may be communicatively coupled to each memory device 720. In some embodiments, the memory devices 720 may be mounted to one or more memory mezzanines on the bottom side of the chassis-less circuit board substrate 602 and may interconnect with a corresponding processor 820 through a ball-grid array.

Each of the processors 820 includes a heatsink 850 secured thereto. Due to the mounting of the memory devices 720 to the bottom side 750 of the chassis-less circuit board substrate 602 (as well as the vertical spacing of the sleds 400 in the corresponding rack 240), the top side 650 of the chassis-less circuit board substrate 602 includes additional "free" area or space that facilitates the use of heatsinks 850 having a larger size relative to traditional heatsinks used in typical servers. Additionally, due to the improved thermal cooling characteristics of the chassis-less circuit board substrate 602, none of the processor heatsinks 850 include cooling fans attached thereto. That is, each of the heatsinks 850 is embodied as a fan-less heatsink. In some embodiments, the heat sinks 850 mounted atop the processors 820 may overlap with the heat sink attached to the communication circuit 830 in the direction of the airflow path 608 due to their increased size, as illustratively suggested by FIG. 9.

Figure 10:
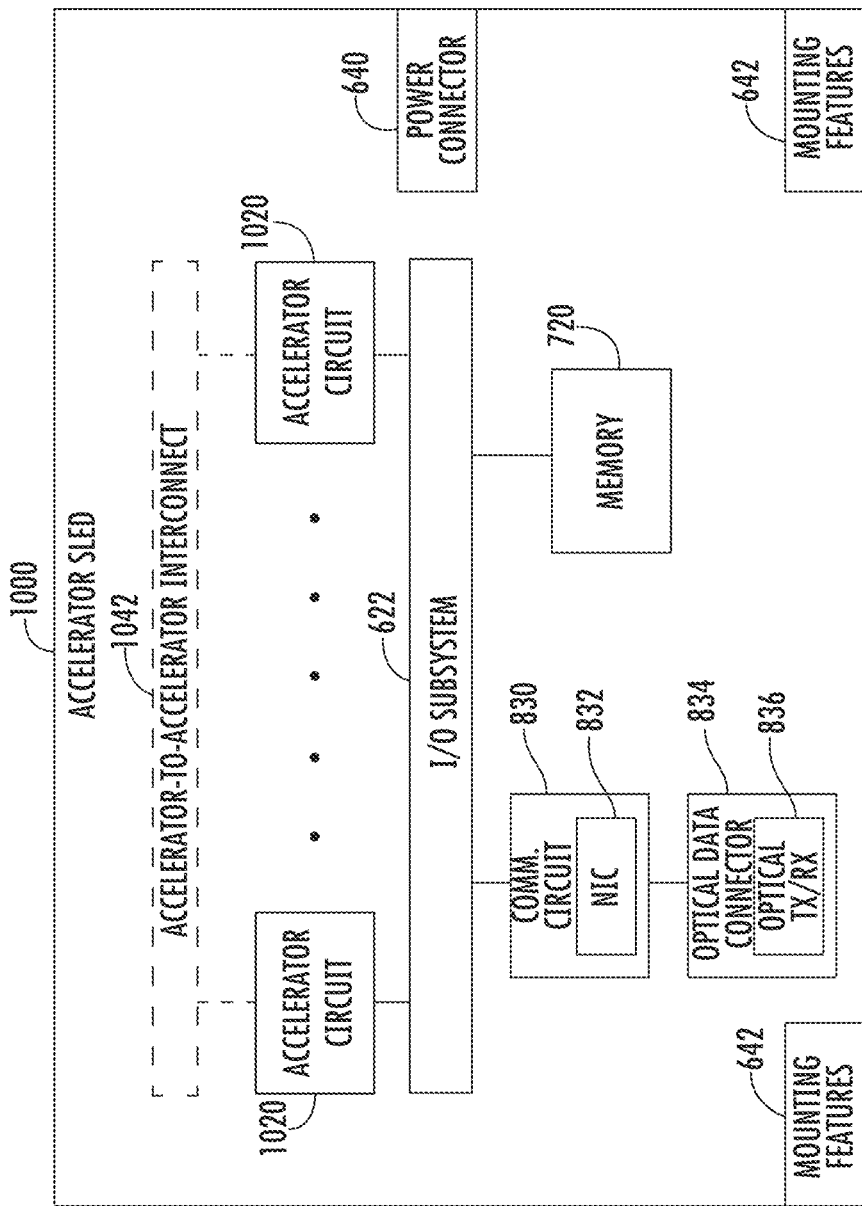
FIG. 10 is a simplified block diagram of at least one embodiment of an accelerator sled usable in a data center.

Referring now to FIG. 10, in some embodiments, the sled 400 may be embodied as an accelerator sled 1000. The accelerator sled 1000 is configured, to perform specialized compute tasks, such as machine learning, encryption, hashing, or other computational-intensive task. In some embodiments, for example, a compute sled 800 may offload tasks to the accelerator sled 1000 during operation. The accelerator sled 1000 includes various components similar to components of the sled 400 and/or compute sled 800, which have been identified in FIG. 10 using the same reference numbers. The description of such components provided above in regard to FIGS. 6, 7, and 8 apply to the corresponding components of the accelerator sled 1000 and is not repeated herein for clarity of the description of the accelerator sled 1000.

Figure 11:
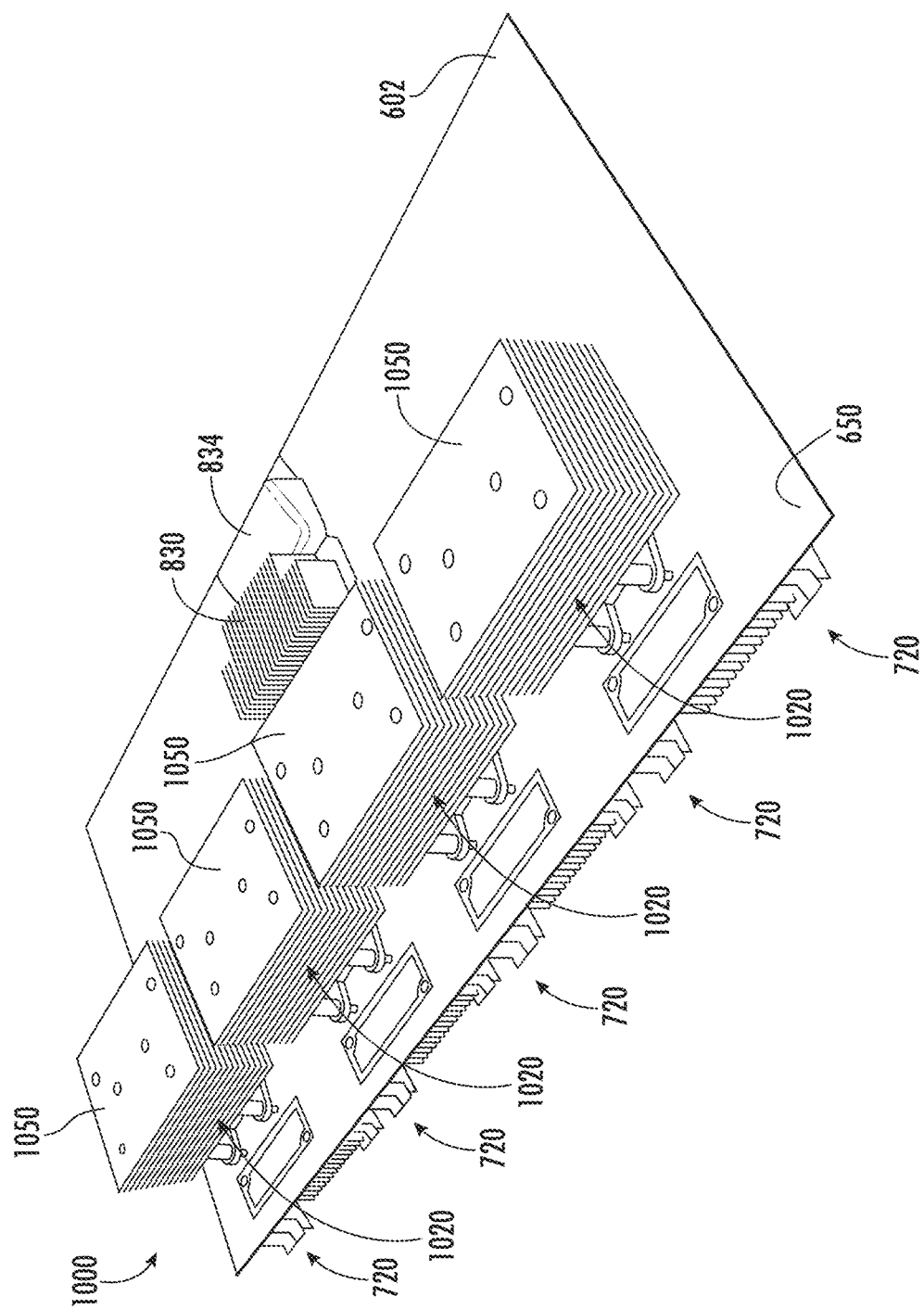
FIG. 11 is a top perspective view of at least one embodiment of an accelerator sled.

In the illustrative accelerator sled 1000, the physical resources 620 are embodied as accelerator circuits 1020. Although only two accelerator circuits 1020 are shown in FIG. 10, it should be appreciated that the accelerator sled 1000 may include additional accelerator circuits 1020 in other embodiments. For example, as shown in FIG. 11, the accelerator sled 1000 may include four accelerator circuits 1020 in some embodiments. The accelerator circuits 1020 may be embodied as any type of processor, co-processor, compute circuit, or other device capable of performing compute or processing operations. For example, the accelerator circuits 1020 may be embodied as, for example, central processing units, cores, field programmable gate arrays (FPGA), application-specific integrated circuits (ASICs), programmable control logic (PCL), security co-processors, graphics processing units (GPUs), neuromorphic processor units, quantum computers, machine learning circuits, or other specialized processors, controllers, devices, and/or circuits.

In some embodiments, the accelerator sled 1000 may also include an accelerator-to-accelerator interconnect 1042. Similar to the resource-to-resource interconnect 624 of the sled 600 discussed above, the accelerator-to-accelerator interconnect 1042 may be embodied as any type of communication interconnect capable of facilitating accelerator-to-accelerator communications. In the illustrative embodiment, the accelerator-to-accelerator interconnect 1042 is embodied as a high-speed point-to-point interconnect (e.g., faster than the I/O subsystem 622). For example, the accelerator-to-accelerator interconnect 1042 may be embodied as a QuickPath Interconnect (QPI), an UltraPath Interconnect (UPI), or other high-speed point-to-point interconnect dedicated to processor-to-processor communications. In some embodiments, the accelerator circuits 1020 may be daisy-chained with a primary accelerator circuit 1020 connected to the NIC 832 and memory 720 through the I/O subsystem 622 and a secondary accelerator circuit 1020 connected to the NIC 832 and memory 720 through a primary accelerator circuit 1020.

Referring now to FIG. 11, an illustrative embodiment of the accelerator sled 1000 is shown. As discussed above, the accelerator circuits 1020, communication circuit 830, and optical data connector 834 are mounted to the top side 650 of the chassis-less circuit board substrate 602. Again, the individual accelerator circuits 1020 and communication circuit 830 are mounted to the top side 650 of the chassis-less circuit board substrate 602 such that no two heat-producing, electrical components shadow each other as discussed above. The memory devices 720 of the accelerator sled 1000 are mounted to the bottom side 750 of the of the chassis-less circuit board substrate 602 as discussed above in regard to the sled 600. Although mounted to the bottom side 750, the memory devices 720 are communicatively coupled to the accelerator circuits 1020 located on the top side 650 via the I/O subsystem 622 (e.g., through vias). Further, each of the accelerator circuits 1020 may include a heatsink 1070 that is larger than a traditional heatsink used in a server. As discussed above with reference to the heatsinks 870, the heatsinks 1070 may be larger than traditional heatsinks because of the "free" area provided by the memory resources 720 being located on the bottom side 750 of the chassis-less circuit board substrate 602 rather than on the top side 650.

Figure 12:
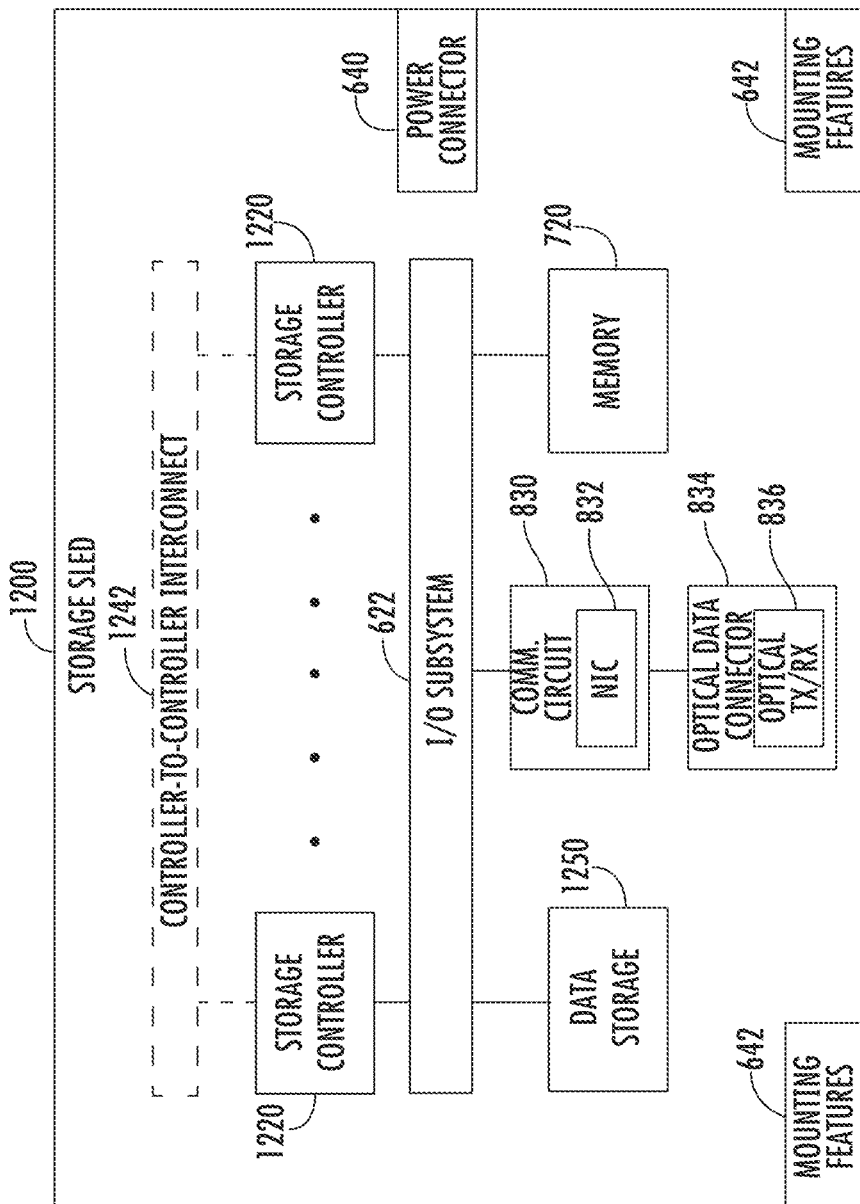
FIG. 12 is a simplified block diagram of at least one embodiment of a storage sled usable in a data center.

Referring now to FIG. 12, in some embodiments, the sled 400 may be embodied as a storage sled 1200. The storage sled 1200 is configured, to store data in a data storage 1250 local to the storage sled 1200. For example, during operation, a compute sled 800 or an accelerator sled 1000 may store and retrieve data from the data storage 1250 of the storage sled 1200. The storage sled 1200 includes various components similar to components of the sled 400 and/or the compute sled 800, which have been identified in FIG. 12 using the same reference numbers. The description of such components provided above with regard to FIGS. 6, 7, and 8 apply to the corresponding components of the storage sled 1200 and is not repeated herein for clarity of the description of the storage sled 1200.

In the illustrative storage sled 1200, the physical resources 620 are embodied as storage controllers 1220. Although only two storage controllers 1220 are shown in FIG. 12, it should be appreciated that the storage sled 1200 may include additional storage controllers 1220 in other embodiments. The storage controllers 1220 may be embodied as any type of processor, controller, or control circuit capable of controlling the storage and retrieval of data into the data storage 1250 based on requests received via the communication circuit 830. In the illustrative embodiment, the storage controllers 1220 are embodied as relatively low-power processors or controllers. For example, in some embodiments, the storage controllers 1220 may be configured to operate at a power rating of about 75 watts.

In some embodiments, the storage sled 1200 may also include a controller-to-controller interconnect 1242. Similar to the resource-to-resource interconnect 624 of the sled 400 discussed above, the controller-to-controller interconnect 1242 may be embodied as any type of communication interconnect capable of facilitating controller-to-controller communications. In the illustrative embodiment, the controller-to-controller interconnect 1242 is embodied as a high-speed point-to-point interconnect (e.g., faster than the I/O subsystem 622). For example, the controller-to-controller interconnect 1242 may be embodied as a QuickPath Interconnect (QPI), an UltraPath Interconnect (UPI), or other high-speed point-to-point interconnect dedicated to processor-to-processor communications.

Figure 13:
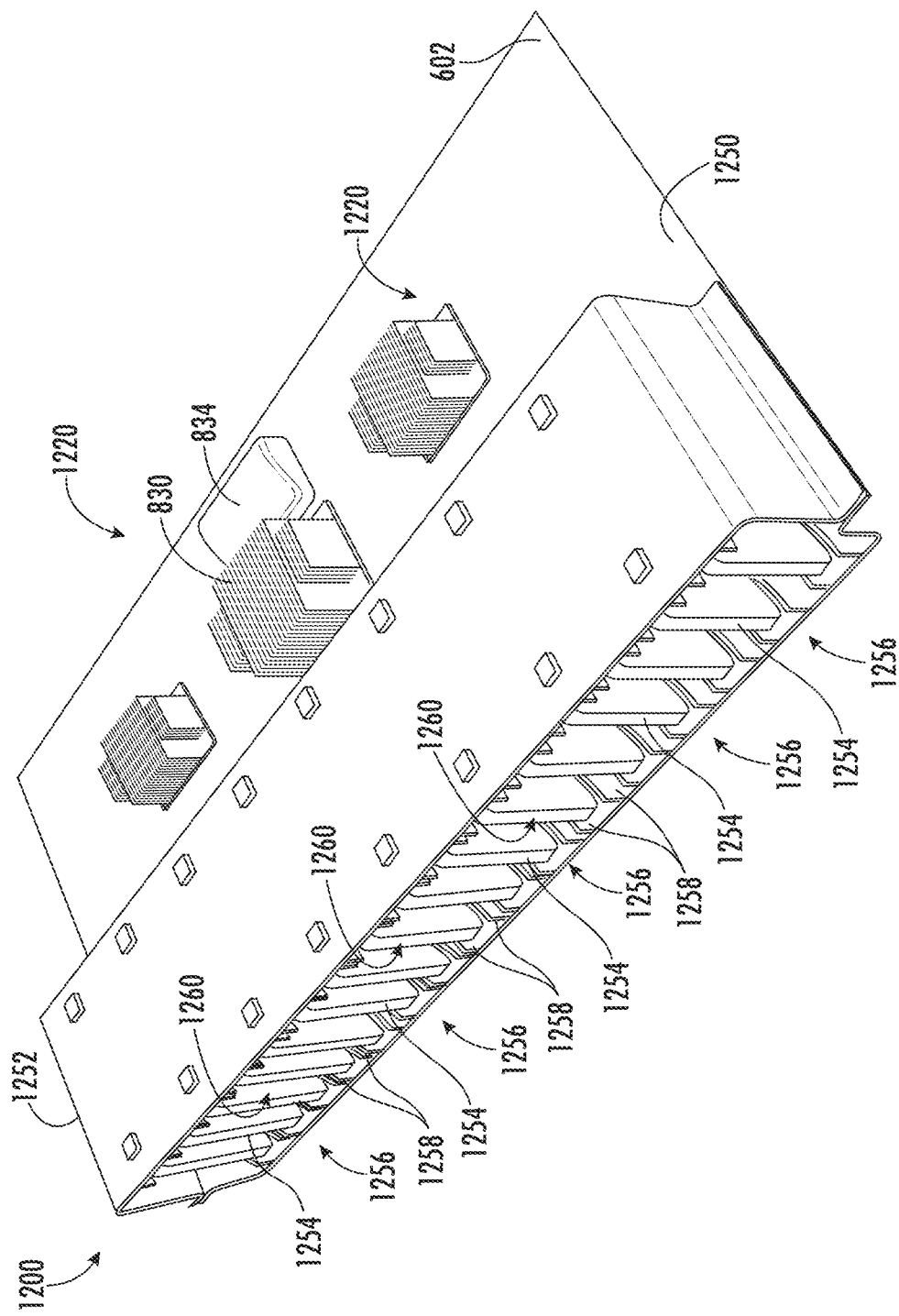
FIG. 13 is a top perspective view of at least one embodiment of a storage sled.

Referring now to FIG. 13, an illustrative embodiment of the storage sled 1200 is shown. In the illustrative embodiment, the data storage 1250 is embodied as, or otherwise includes, a storage cage 1252 configured to house one or more solid state drives (SSDs) 1254. To do so, the storage cage 1252 includes a number of mounting slots 1256, each of which is configured to receive a corresponding solid state drive 1254. Each of the mounting slots 1256 includes a number of drive guides 1258 that cooperate to define an access opening 1260 of the corresponding mounting slot 1256. The storage cage 1252 is secured to the chassis-less circuit board substrate 602 such that the access openings face away from (e.g., toward the front of) the chassis-less circuit board substrate 602. As such, solid state drives 1254 are accessible while the storage sled 1200 is mounted in a corresponding rack 204. For example, a solid state drive 1254 may be swapped out of a rack 240 (e.g., via a robot) while the storage sled 1200 remains mounted in the corresponding rack 240.

The storage cage 1252 illustratively includes sixteen mounting slots 1256 and is capable of mounting and storing sixteen solid state drives 1254. Of course, the storage cage 1252 may be configured to store additional or fewer solid state drives 1254 in other embodiments. Additionally, in the illustrative embodiment, the solid state drivers are mounted vertically in the storage cage 1252, but may be mounted in the storage cage 1252 in a different orientation in other embodiments. Each solid state drive 1254 may be embodied as any type of data storage device capable of storing long term data. To do so, the solid state drives 1254 may include volatile and non-volatile memory devices discussed above.

As shown in FIG. 13, the storage controllers 1220, the communication circuit 830, and the optical data connector 834 are illustratively mounted to the top side 650 of the chassis-less circuit board substrate 602. Again, as discussed above, any suitable attachment or mounting technology may be used to mount the electrical components of the storage sled 1200 to the chassis-less circuit board substrate 602 including, for example, sockets (e.g., a processor socket), holders, brackets, soldered connections, and/or other mounting or securing techniques.

As discussed above, the individual storage controllers 1220 and the communication circuit 830 are mounted to the top side 650 of the chassis-less circuit board substrate 602 such that no two heat-producing, electrical components shadow each other. For example, the storage controllers 1220 and the communication circuit 830 are mounted in corresponding locations on the top side 650 of the chassis-less circuit board substrate 602 such that no two of those electrical components are linearly in-line with each other along the direction of the airflow path 608.

The memory devices 720 of the storage sled 1200 are mounted to the bottom side 750 of the of the chassis-less circuit board substrate 602 as discussed above in regard to the sled 400. Although mounted to the bottom side 750, the memory devices 720 are communicatively coupled to the storage controllers 1220 located on the top side 650 via the I/O subsystem 622. Again, because the chassis-less circuit board substrate 602 is embodied as a double-sided circuit board, the memory devices 720 and the storage controllers 1220 may be communicatively coupled by one or more vias, connectors, or other mechanisms extending through the chassis-less circuit board substrate 602. Each of the storage controllers 1220 includes a heatsink 1270 secured thereto. As discussed above, due to the improved thermal cooling characteristics of the chassis-less circuit board substrate 602 of the storage sled 1200, none of the heatsinks 1270 include cooling fans attached thereto. That is, each of the heatsinks 1270 is embodied as a fan-less heatsink.

Figure 14:
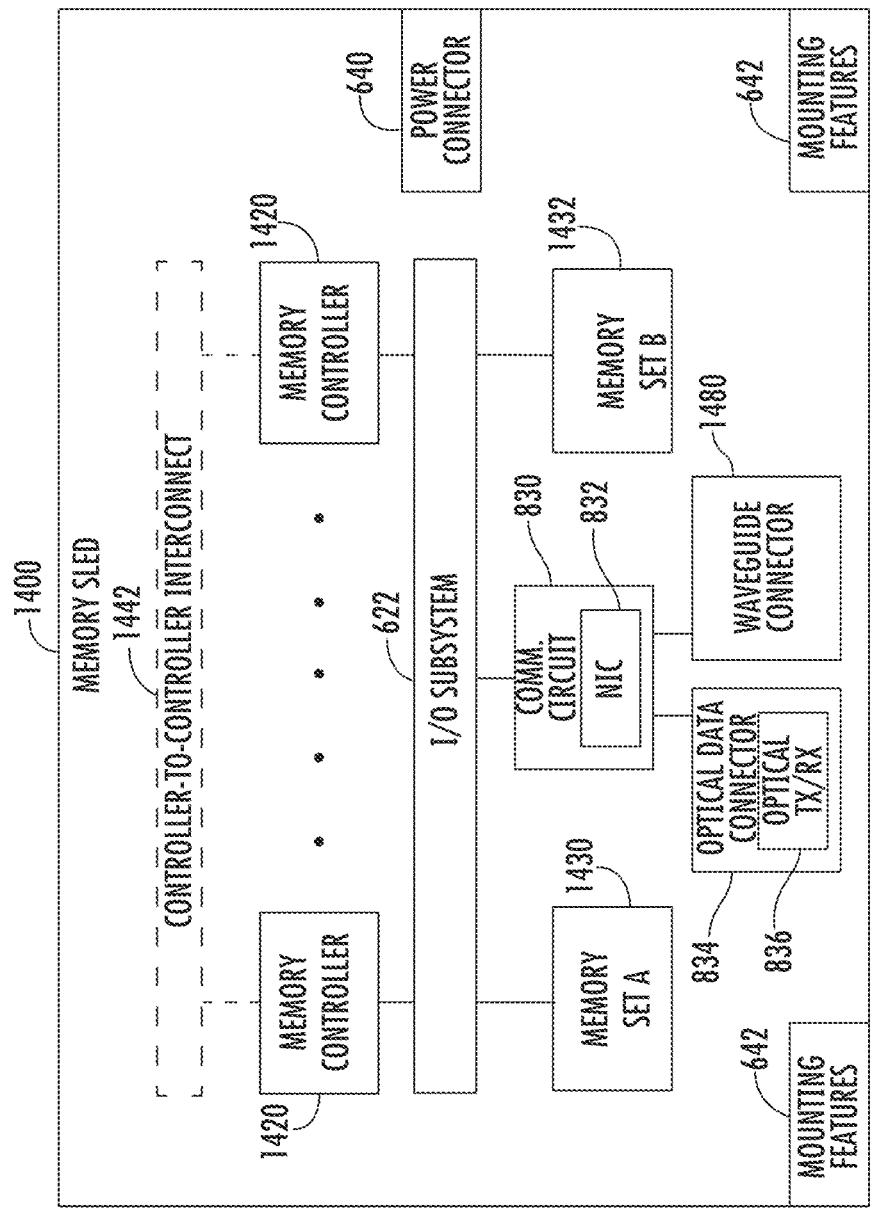
FIG. 14 is a simplified block diagram of at least one embodiment of a memory sled usable in a data center.

Referring now to FIG. 14, in some embodiments, the sled 400 may be embodied as a memory sled 1400. The storage sled 1400 is optimized, or otherwise configured, to provide other sleds 400 (e.g., compute sleds 800, accelerator sleds 1000, etc.) with access to a pool of memory (e.g., in two or more sets 1430, 1432 of memory devices 720) local to the memory sled 1200. For example, during operation, a compute sled 800 or an accelerator sled 1000 may remotely write to and/or read from one or more of the memory sets 1430, 1432 of the memory sled 1200 using a logical address space that maps to physical addresses in the memory sets 1430, 1432. The memory sled 1400 includes various components similar to components of the sled 400 and/or the compute sled 800, which have been identified in FIG. 14 using the same reference numbers. The description of such components provided above in regard to FIGS. 6, 7, and 8 apply to the corresponding components of the memory sled 1400 and is not repeated herein for clarity of the description of the memory sled 1400.

In the illustrative memory sled 1400, the physical resources 620 are embodied as memory controllers 1420. Although only two memory controllers 1420 are shown in FIG. 14, it should be appreciated that the memory sled 1400 may include additional memory controllers 1420 in other embodiments. The memory controllers 1420 may be embodied as any type of processor, controller, or control circuit capable of controlling the writing and reading of data into the memory sets 1430, 1432 based on requests received via the communication circuit 830. In the illustrative embodiment, each memory controller 1420 is connected to a corresponding memory set 1430, 1432 to write to and read from memory devices 720 within the corresponding memory set 1430, 1432 and enforce any permissions (e.g., read, write, etc.) associated with sled 400 that has sent a request to the memory sled 1400 to perform a memory access operation (e.g., read or write).

In some embodiments, the memory sled 1400 may also include a controller-to-controller interconnect 1442. Similar to the resource-to-resource interconnect 624 of the sled 400 discussed above, the controller-to-controller interconnect 1442 may be embodied as any type of communication interconnect capable of facilitating controller-to-controller communications. In the illustrative embodiment, the controller-to-controller interconnect 1442 is embodied as a high-speed point-to-point interconnect (e.g., faster than the I/O subsystem 622). For example, the controller-to-controller interconnect 1442 may be embodied as a QuickPath Interconnect (QPI), an UltraPath Interconnect (UPI), or other high-speed point-to-point interconnect dedicated to processor-to-processor communications. As such, in some embodiments, a memory controller 1420 may access, through the controller-to-controller interconnect 1442, memory that is within the memory set 1432 associated with another memory controller 1420. In some embodiments, a scalable memory controller is made of multiple smaller memory controllers, referred to herein as "chiplets", on a memory sled (e.g., the memory sled 1400). The chiplets may be interconnected (e.g., using EMIB (Embedded Multi-Die Interconnect Bridge)). The combined chiplet memory controller may scale up to a relatively large number of memory controllers and I/O ports, (e.g., up to 16 memory channels). In some embodiments, the memory controllers 1420 may implement a memory interleave (e.g., one memory address is mapped to the memory set 1430, the next memory address is mapped to the memory set 1432, and the third address is mapped to the memory set 1430, etc.). The interleaving may be managed within the memory controllers 1420, or from CPU sockets (e.g., of the compute sled 800) across network links to the memory sets 1430, 1432, and may improve the latency associated with performing memory access operations as compared to accessing contiguous memory addresses from the same memory device.

Further, in some embodiments, the memory sled 1400 may be connected to one or more other sleds 400 (e.g., in the same rack 240 or an adjacent rack 240) through a waveguide, using the waveguide connector 1480. In the illustrative embodiment, the waveguides are 64 millimeter waveguides that provide 16 Rx (e.g., receive) lanes and 16 Tx (e.g., transmit) lanes. Each lane, in the illustrative embodiment, is either 16 GHz or 32 GHz. In other embodiments, the frequencies may be different. Using a waveguide may provide high throughput access to the memory pool (e.g., the memory sets 1430, 1432) to another sled (e.g., a sled 400 in the same rack 240 or an adjacent rack 240 as the memory sled 1400) without adding to the load on the optical data connector 834.

Figure 15:
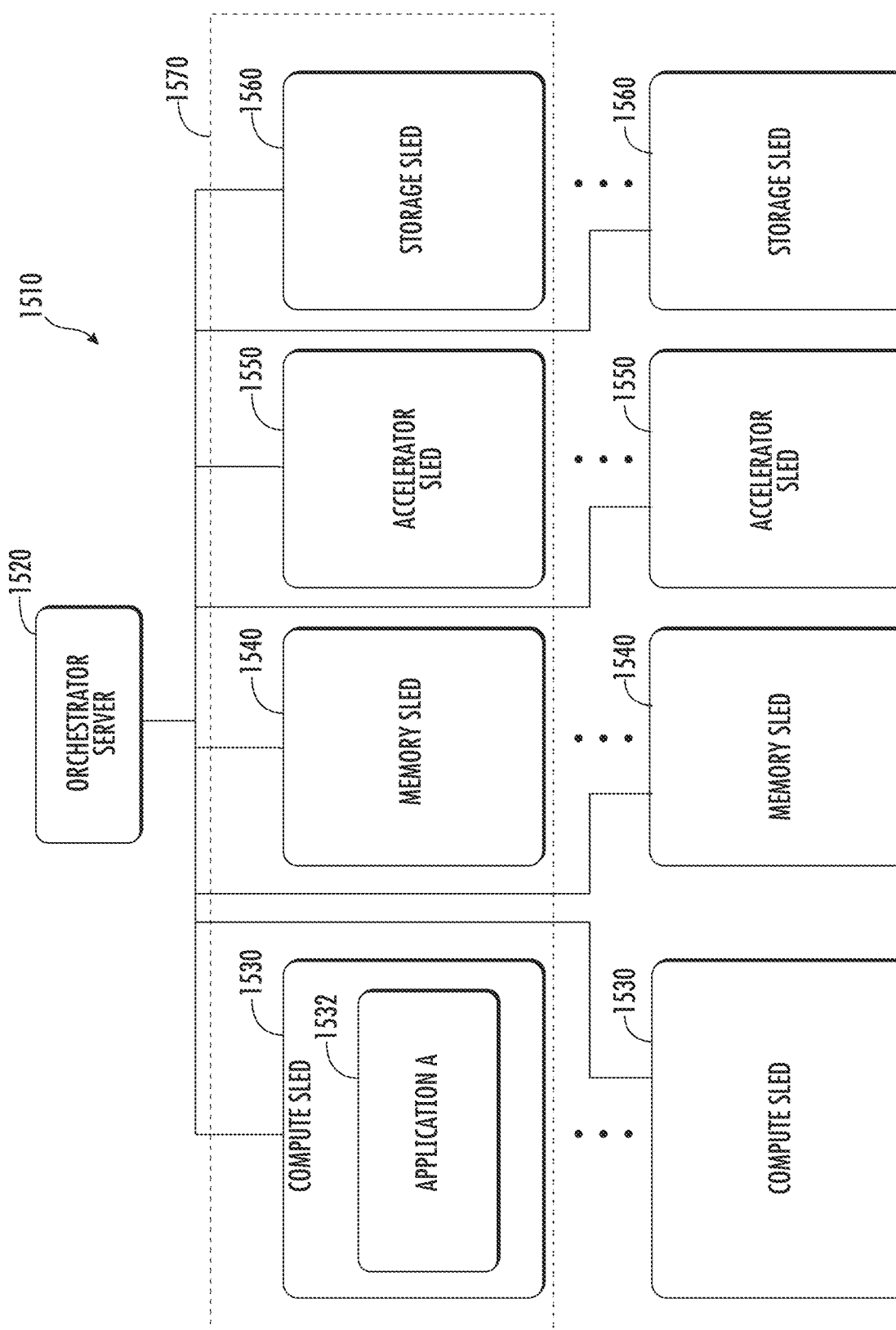
FIG. 15 depicts a system for executing one or more workloads.

Referring now to FIG. 15, a system for executing one or more workloads (e.g., applications) may be implemented in accordance with the data center 100. In the illustrative embodiment, the system 1510 includes an orchestrator server 1520, which may be embodied as a managed node comprising a compute device (e.g., a processor 820 on a compute sled 800) executing management software (e.g., a cloud operating environment, such as OpenStack) that is communicatively coupled to multiple sleds 400 including a large number of compute sleds 1530 (e.g., each similar to the compute sled 800), memory sleds 1540 (e.g., each similar to the memory sled 1400), accelerator sleds 1550 (e.g., each similar to the memory sled 1000), and storage sleds 1560 (e.g., each similar to the storage sled 1200). One or more of the sleds 1530, 1540, 1550, 1560 may be grouped into a managed node 1570, such as by the orchestrator server 1520, to collectively perform a workload (e.g., an application 1532 executed in a virtual machine or in a container). The managed node 1570 may be embodied as an assembly of physical resources 620, such as processors 820, memory resources 720, accelerator circuits 1020, or data storage 1250, from the same or different sleds 400. Further, the managed node may be established, defined, or "spun up" by the orchestrator server 1520 at the time a workload is to be assigned to the managed node or at any other time, and may exist regardless of whether any workloads are presently assigned to the managed node. In the illustrative embodiment, the orchestrator server 1520 may selectively allocate and/or deallocate physical resources 620 from the sleds 400 and/or add or remove one or more sleds 400 from the managed node 1570 as a function of quality of service (QoS) targets (e.g., a target throughput, a target latency, a target number instructions per second, etc.) associated with a service level agreement for the workload (e.g., the application 1532). In doing so, the orchestrator server 1520 may receive telemetry data indicative of performance conditions (e.g., throughput, latency, instructions per second, etc.) in each sled 400 of the managed node 1570 and compare the telemetry data to the quality of service targets to determine whether the quality of service targets are being satisfied. The orchestrator server 1520 may additionally determine whether one or more physical resources may be deallocated from the managed node 1570 while still satisfying the QoS targets, thereby freeing up those physical resources for use in another managed node (e.g., to execute a different workload). Alternatively, if the QoS targets are not presently satisfied, the orchestrator server 1520 may determine to dynamically allocate additional physical resources to assist in the execution of the workload (e.g., the application 1532) while the workload is executing. Similarly, the orchestrator server 1520 may determine to dynamically deallocate physical resources from a managed node if the orchestrator server 1520 determines that deallocating the physical resource would result in QoS targets still being met.

Additionally, in some embodiments, the orchestrator server 1520 may identify trends in the resource utilization of the workload (e.g., the application 1532), such as by identifying phases of execution (e.g., time periods in which different operations, each having different resource utilizations characteristics, are performed) of the workload (e.g., the application 1532) and pre-emptively identifying available resources in the data center 100 and allocating them to the managed node 1570 (e.g., within a predefined time period of the associated phase beginning). In some embodiments, the orchestrator server 1520 may model performance based on various latencies and a distribution scheme to place workloads among compute sleds and other resources (e.g., accelerator sleds, memory sleds, storage sleds) in the data center 100. For example, the orchestrator server 1520 may utilize a model that accounts for the performance of resources on the sleds 400 (e.g., FPGA performance, memory access latency, etc.) and the performance (e.g., congestion, latency, bandwidth) of the path through the network to the resource (e.g., FPGA). As such, the orchestrator server 1520 may determine which resource(s) should be used with which workloads based on the total latency associated with each potential resource available in the data center 100 (e.g., the latency associated with the performance of the resource itself in addition to the latency associated with the path through the network between the compute sled executing the workload and the sled 400 on which the resource is located).

In some embodiments, the orchestrator server 1520 may generate a map of heat generation in the data center 100 using telemetry data (e.g., temperatures, fan speeds, etc.) reported from the sleds 400 and allocate resources to managed nodes as a function of the map of heat generation and predicted heat generation associated with different workloads, to maintain a target temperature and heat distribution in the data center 100. Additionally or alternatively, in some embodiments, the orchestrator server 1520 may organize received telemetry data into a hierarchical model that is indicative of a relationship between the managed nodes (e.g., a spatial relationship such as the physical locations of the resources of the managed nodes within the data center 100 and/or a functional relationship, such as groupings of the managed nodes by the customers the managed nodes provide services for, the types of functions typically performed by the managed nodes, managed nodes that typically share or exchange workloads among each other, etc.). Based on differences in the physical locations and resources in the managed nodes, a given workload may exhibit different resource utilizations (e.g., cause a different internal temperature, use a different percentage of processor or memory capacity) across the resources of different managed nodes. The orchestrator server 1520 may determine the differences based on the telemetry data stored in the hierarchical model and factor the differences into a prediction of future resource utilization of a workload if the workload is reassigned from one managed node to another managed node, to accurately balance resource utilization in the data center 100. In some embodiments, the orchestrator server 1520 may identify patterns in resource utilization phases of the workloads and use the patterns to predict future resource utilization of the workloads.

To reduce the computational load on the orchestrator server 1520 and the data transfer load on the network, in some embodiments, the orchestrator server 1520 may send self-test information to the sleds 400 to enable each sled 400 to locally (e.g., on the sled 400) determine whether telemetry data generated by the sled 400 satisfies one or more conditions (e.g., an available capacity that satisfies a predefined threshold, a temperature that satisfies a predefined threshold, etc.). Each sled 400 may then report back a simplified result (e.g., yes or no) to the orchestrator server 1520, which the orchestrator server 1520 may utilize in determining the allocation of resources to managed nodes.

DMA Engine

In a distributed memory architecture, hyperconverged shared memory solutions provide sharing of memory that is directly attached to a central processing unit (CPU). This architecture can create a dependence between the memory that is allocated to the local host and the memory allocated to a remote host and may not enable the host to have its own memory space that is completely isolated from access by devices other than the host. This architecture may not provide isolation of use of the local memory between a local node and remote nodes.

In a cloud environment, the performance of a local host's application can be impacted by the remote hosts accessing the memory used by the application. For example, a noisy neighbor problem can arise in a virtualized environment as the host's memory is shared by tenants on the host as well as tenants from remote hosts and any of the tenants may utilize memory to the detriment of unavailability of memory for use by other tenants.

In a bare metal hosted environment, where a CPU is entirely rented to a tenant, a trusted hypervisor may not run on the CPU to enforce security isolation between the local host accessing the CPU's direct attached memory and a remote host accessing the same. Security and confidentiality of data available to a tenant may be compromised as the data may be accessed by another tenant.

Various embodiments provide sharing of a local memory as part of a distributed memory pool across a network or fabric by use of a smart controller or network interface controller (NIC) to manage use of the local memory. Various embodiments provide for sharing of local memory to a local host or a remote host using the smart controller or NIC. Various embodiments provide a network or fabric-attached smart controller to access host physical memory using a high speed interface and the physical memory can be allocated, by the smart controller or NIC, to the host and devices connected to a network or fabric. The smart controller or NIC can be within an infrastructure provider's trust and management domain and can attempt to provide both performance and security isolation between local and remote hosts by providing address translation and quality of service (QoS) specific to the tenants (or hosts).

Figure 16:
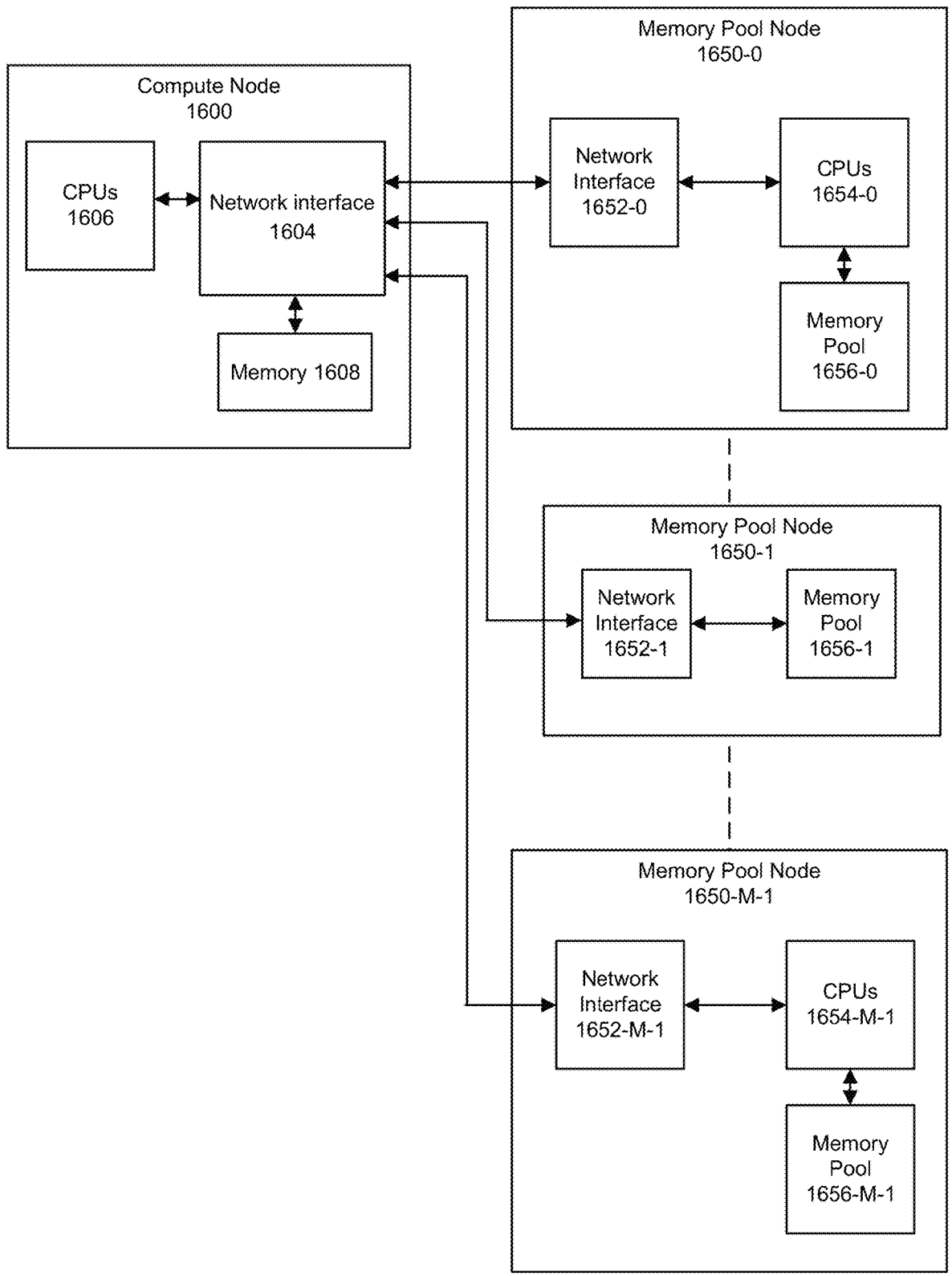
FIG. 16 depicts an example of memory pools accessible by multiple hosts.

FIG. 16 depicts an example of memory pools accessible by a computing node. A system topology can include N compute nodes connected to M memory pool nodes, where N and M are integers and can be the same or different values. Memory pool nodes can provide some of the memory used by the N compute nodes and a remainder of the compute node's memory needs may be met by local memory. Partitioning of memory in memory pool nodes between or assigned to the N compute nodes can be managed by system software (e.g., OS, hypervisor (e.g., Linux, VMware ESX, Windows Hyper-V), orchestrator (e.g., Kubernetes, OpenStack, Slurm (High Performance Computing (HPC)), Open Source NFV Management and Orchestration (MANO) from European Telecommunications Standards Institute (ETSI)'s Open Source Mano (OSM) group), pod manager, or traffic manager on a same or different host node, fabric manager (e.g., CXL fabric manager).

Compute node 1600 can be coupled to any memory pool node 1650 using a network or fabric. Memory pool node 1650 can include a network or fabric interface, compute resources (e.g., CPUs or accelerators), and memory resources (e.g., memory, storage, or cache). Although this example shows merely one compute node coupled to multiple memory pool nodes, multiple compute nodes can be coupled to multiple memory pool nodes.

Compute node 1600 can include a network or fabric interface (e.g., network interface 1604), compute resources (e.g., CPUs or accelerators), and memory resources (e.g., memory 1608, storage, or cache). For example, compute node 1600 can execute workloads or applications. For example, compute node 1600 can be implemented as a server, rack of servers, computing platform, or others. In some examples, a host node can include one or more of: CPUs 1606, a core, graphics processing unit (GPU), field programmable gate array (FPGA), or application specific integrated circuit (ASIC). In some examples, a core can be sold or designed by Intel®, ARM®, AMD®, Qualcomm®, IBM®, Texas Instruments®, among others. Any processor can execute an operating system, driver, applications, and/or a virtualized execution environment (VEE) (e.g., virtual machine or container). In some examples, an operating system (OS) can be Linux®, Windows®, FreeBSD®, Android®, MacOS®, iOS®, or any other operating system.

Memory 1608 can include one or more of: one or more registers, one or more cache devices (e.g., level 1 cache (L1), level 2 cache (L2), level 3 cache (L3), lower level cache (LLC)), volatile memory device, non-volatile memory device, or persistent memory device. For example, memory 1608 can include static random access memory (SRAM) memory technology or memory technology consistent with high bandwidth memory (HBM), or double data rate (DDRx, where x is an integer), among others. Memory 1608 can be connected to network interface 1604 using a high speed interface (e.g., DDR, CXL (e.g., Compute Express Link Specification revision 2.0, version 0.9 (2020), as well as earlier versions, revisions or variations thereof), Peripheral Component Interconnect express (PCIe) (e.g., PCI Express Base Specification 1.0 (2002), as well as earlier versions, revisions or variations thereof).

In some examples, memory 1608 can be accessed by CPUs 1606 and/or network interface 1604 using a device interface (e.g., PCIe) or memory interface (e.g., DDR, CXL). In some examples, memory 1608 are coupled to CPUs 1606 and/or network interface 1604 using conductive leads of one or more circuit boards. In some examples, memory 1608 is part of a same system on chip (SoC) as CPUs 1606 and/or network interface 1604.

According to various embodiments, network interface 1604 can include one or more cores, graphics processing unit (GPU), field programmable gate array (FPGA), or application specific integrated circuit (ASIC). Network interface 1604 can provide network interface capabilities to generate or decode packets transmitted or received from a network or fabric. According to various embodiments, network interface 1604 can be configured to manage access to memory 1608 or portions of any of memory pools 1650-0 to 1650-M-1 by software executing on CPUs 1606 and CPUs 1654-0 to 1654-M-1 or other devices (e.g., accelerators, GPUs, and so forth). For example, network interface 1604 can partition memory 1608 dynamically and allocate those partitions to both local attached host(s) and/or fabric attached hosts (e.g., one or more compute nodes such as compute node 1600).

Network interface 1604 or one or more of network interfaces 1652-0 to 1652-M-1 can be part of different Infrastructure Processing Units (IPUs) or data processing units (DPUs). An IPU or DPU can include a SmartNIC with one or more programmable or fixed function processors to perform offload of operations that could have been performed by a CPU. The IPU or DPU can include one or more memory devices. In some examples, the IPU or DPU can perform virtual switch operations, manage storage transactions (e.g., compression, cryptography, virtualization), and manage operations performed on other IPUs or DPUs, servers, or devices.

In some examples, network interface 1604 or one or more of network interfaces 1652-0 to 1652-M-1 can be within a domain of trust whereby a memory access request issued by one of network interface 1604 or one or more of network interfaces 1652-0 to 1652-M-1 can be permitted to access data in a memory device managed by another of network interface 1604 or one or more of network interfaces 1652-0 to 1652-M-1. In some examples, some, but not all, of network interface 1604 or one or more of network interfaces 1652-0 to 1652-M-1 are within a domain of trust. In some examples, where network interfaces are within a domain of trust, a network interface that receives a memory access request can forward the memory access request to another network interface to perform if the memory access request is associated with memory managed by the memory access request. In some examples, where network interfaces are within a domain of trust, a network interface can allocate memory within a memory device locally connected to another network interface within the domain of trust.

For example, network interface 1604 can authenticate hosts using fabric specific mechanisms and ensure security for communications between any host and network interface 1604 such as IP security (IPSec), Transport Layer Security (TLS), link encryption, or access control list (ACL). In some examples, network interface 1604 can use fabric-specific protocols to expose access to memory 1608 via a network fabric to other hosts or memory pool nodes (e.g., nodes 1650-0 to 1650-M-1) such as remote direct memory access (RDMA), CXL-over-Ethernet, or a custom protocol. For example, network interface 1604 can have at least one core or processor to be able to run a management stack to provision, manage and monitor memory 1608 and the controller's operation (e.g., network operations on the fabric, telemetry, etc.). For example, network interface 1604 can enforce per host Quality-of-Service and access right enforcement so that priority can be granted to access memory 1608 to some hosts or applications executed thereon over other hosts or applications executed thereon. In some examples, network interface 1604 can operate in stand-alone mode (e.g., node 1650-1) where it is not attached to a host but contains or is connected to memory 1608 that is made available on the fabric for other hosts or memory pool nodes.

In a similar manner, where allocated, any of network interfaces 1652-0 to 1652-M−1 can provide access to respective memory pools 1656-0 to 1656-M−1 to its node or other nodes. In other words, any network interface can be provisioned to provide access to locally attached memory to any other requester including a requester on its own platform. Any of memory pools 1656-0 to 1656-M−1 can include one or more of: one or more registers, one or more cache devices (e.g., level 1 cache (L1), level 2 cache (L2), level 3 cache (L3), lower level cache (LLC)), volatile memory device, non-volatile memory device, or persistent memory device.

Any of memory pool nodes 1650-0 to 1650-M−1 can include respective network interfaces 1652-0 to 1652-M−1 to communicate with any other memory pool node or compute node 1600 as a remote device through one or more routers or switches. In this example, memory pool node 1650-0 can include a network interface 1652-0 coupled to memory pool 1656-0 using a high speed interface (e.g., DDRx, CXL, PCIe). Network interface 1652-0 can manage use of memory pool 1656-0 by CPUs 1654-0 of the same memory pool node or a different memory pool node or compute node 1600. In this example, memory pool node 1650-M−1 can include a network interface 1652-M−1 coupled to CPUs 1654-M−1. CPUs 1654-M−1 can be coupled to memory pool 1656-M−1 using a high speed interface (e.g., DDRx, CXL, PCIe).

A memory access request (e.g., read, write, read-modify-write) can be issued by an application, virtualized execution environment (VEE) (e.g., virtual machine or container), operating system (OS) or other software executed by CPUs 1606, CPUs 1654-0 to 1654-M−1, or other device such as an accelerator device. Content stored in any memory device can include data, metadata, and/or executable instructions. Network interface 1604 can direct the memory access request to the applicable memory device (e.g., memory 1608 or any of memory pools 1656-0 to 1656-M−1). Network interface 1604 can receive memory access requests from any host and determine where to route the memory request. Network interface 1604 can arbitrate requests for data from hosts (inbound and outbound).

Some examples of network interface 1604 or network interfaces 1652-0 to 1652-M−1 can include a DMA engine that provides data mover and transformation operations. For example, a DMA engine can validate CRC or checksum values in connection with storage and networking applications. For example, the DMA engine can perform memory compare and delta generation or merge to support VM or container migration, VM or container check-pointing (e.g., to revert a VM or container to a previous state) and software managed memory deduplication usages.

DMA is a technology that allows an input/output (I/O) device to bypass a central processing unit (CPU) or core, and to send or receive data directly to or from a system memory. Because DMA allows the CPU or core to not manage a copy operation when sending or receiving data to or from the system memory, the CPU or core can be available to perform other operations. Without DMA, when the CPU or core is using programmed input/output, the CPU or core is typically occupied for the entire duration of a read or write operation and is unavailable to perform other work. With DMA, the CPU or core can, for example, initiate a data transfer, and then perform other operations while the data transfer is in progress. The CPU or core can receive an interrupt from a DMA controller when the data transfer is finished.

High speed interconnects can be used to couple a compute node 1600 and memory pool nodes 1650-0 to 1650-M−1 such as one or more of: Ethernet (IEEE 802.3), remote direct memory access (RDMA), InfiniBand, Internet Wide Area RDMA Protocol (iWARP), Transmission Control Protocol (TCP), User Datagram Protocol (UDP), quick UDP Internet Connections (QUIC), RDMA over Converged Ethernet (RoCE), Peripheral Component Interconnect express (PCIe), Intel QuickPath Interconnect (QPI), Intel® Ultra Path Interconnect (UPI), Intel On-Chip System Fabric (IOSF), Omnipath, Compute Express Link (CXL), HyperTransport, high-speed fabric, NVLink, Advanced Microcontroller Bus Architecture (AMBA) interconnect, OpenCAPI, Gen-Z, Cache Coherent Interconnect for Accelerators (CCIX), Infinity Fabric (IF), 3GPP Long Term Evolution (LTE) (4G), 3GPP 5G, and variations thereof. In some examples, data can be copied or stored to virtualized storage nodes using protocols such as Non-Volatile Memory Express (NVMe) or NVMe over fabrics (NVMe-oF) (or iSCSI storage command generation). For example, NVMe-oF is described at least in NVM Express, Inc., "NVM Express Over Fabrics," Revision 1.0, Jun. 5, 2016, and specifications referenced therein and variations and revisions thereof.

Figure 17:
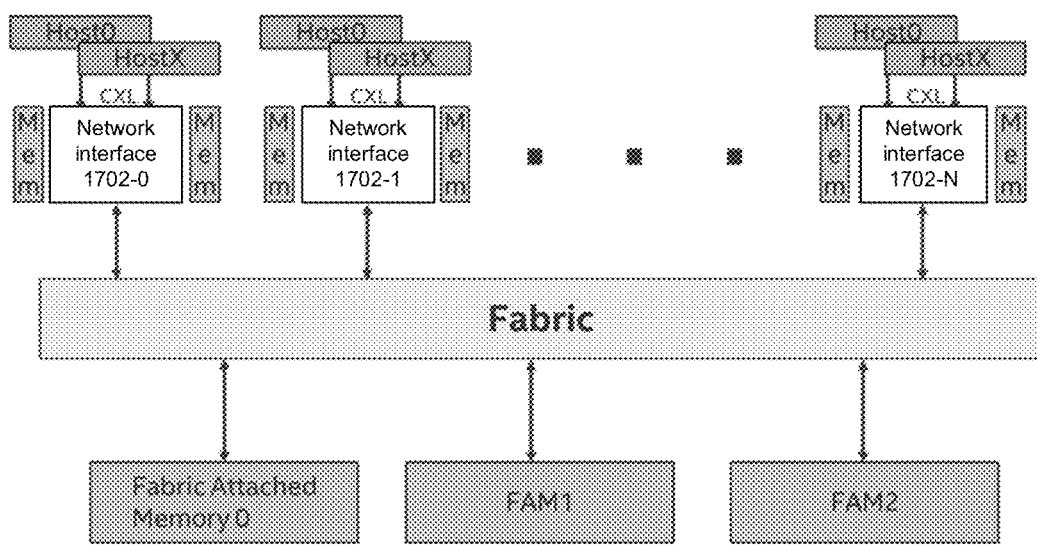
FIG. 17 depicts an example system.

FIG. 17 shows a system of pooled memory and local memory shared with a cluster of hosts using distributed physical memory behind network interfaces 1702-0 to 1702-N (e.g., smart controllers) (where N is an integer). In some examples, any of network interfaces 1702-0 to 1702-N can be attached to a different host clusters (e.g., a host cluster includes one or more of hosts 0 an X) (e.g., servers) using a high speed interface (e.g., CXL, DDRx, PCIe). For example, a host can issue a memory access request using a device interface (e.g., PCIe) or memory interface (e.g., CXL or DDRx). Host clusters can be attached to fabric attached memories (FAMs) via a fabric (e.g., CXL.mem compatible, Ethernet, or others) to allow for memory to be pooled or shared among host clusters. In some examples, network interfaces 1702-0 to 1702-N can contain or provide access to one or more physical memory devices (shown as mem) (e.g., DDRx DRAM, DDR-T Optane or CXL Optane) that can be exposed to one or more of the fabric attached host clusters, or subsets thereof.

Fabric Attached Memory (FAM) can refer to a network interface that exists in stand-alone mode that is not attached to a host but is attached to one or more memory devices. Memory in a FAM can be made available via the fabric to other host clusters. In some examples, memory technology and devices in FAM can be higher latency and/or cheaper than memory technology and devices in memory locally attached to a smart controller and hosts so that a memory hierarchy provides near memory in the memory devices and the far memory in the FAMs. For example, latency of access to a FAM can include packet formation and packet decoding for communication over a fabric or network as well as fabric or network media latency. For example, a central management entity (e.g., orchestrator) can allocate memory and storage devices that a smart controller can configure and allocate to use. Various embodiments provide composable memory devices with different tiers and capacities of memory such as composable fast memory and composable high capacity low cost memory that is fabric attached.

Various embodiments provide a scalable but performant architecture for pooled memory deployments. Various embodiments provide memory available to a host that can be dynamically provisioned with high performance near memory and lower cost high capacity memory (e.g., FAM) via a fabric. In some examples, if a smart controller is modular, it can be upgraded independent of the server that it is attached to. In some examples, more memory (e.g., FAM) can be added to any pool by adding FAMs without needing to add servers.

In some examples, a memory address range can correspond with a particular latency level. For example, memory address range x0000 0000 to x0000 1000 can correspond to lower latency fast memory attached to a smart controller whereas address range x1000 0000 to x1000 1000 can correspond to higher latency FAM memory devices. Note that a FAM may appear as higher latency to a host because of latency arising from transmission across a fabric and receipt of responses (e.g., fabric communication-related latency).

The following provides examples of memory allocations. For example, an application developer, hypervisor, or operating system (OS) can choose which memory device to use to store data. An application can tag data with a priority tag to hint at whether to choose fast local memory or higher latency pooled memory where pooled memory and fast memory are available for use by application. For example, a database application can utilize pooled memory or artificial intelligence (AI) applications can utilize fast local memory. Some virtual machines (VMs) have time sensitive requirements for access to data.

Non-uniform memory access (NUMA) techniques can be used by an application whereby the application can specify priority of data with NUMA tags. NUMA tags can be available in NUMA aware libraries such as from Windows, Linux, iOS, VMWare, etc.

Figure 18:
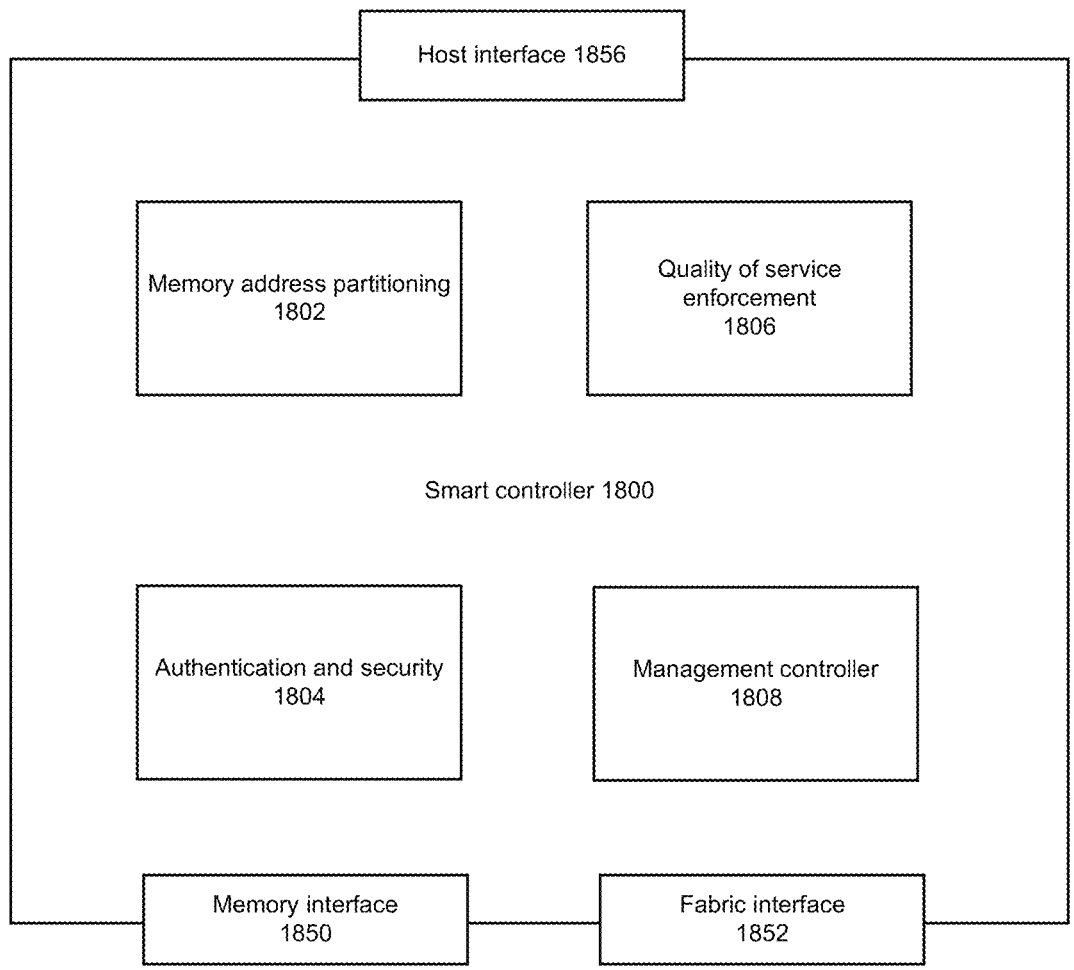
FIG. 18 depicts an example smart controller.

FIG. 18 depicts an example smart controller. In this example, various circuitry within a smart controller are shown. For example, memory address partitioning 1802 can allocate one or more memory addresses in a local memory attached to memory interface 1850 or a memory device attached to fabric interface 1852 for use by one or more requesters. A requester can be any of an application, virtual machine, container, CPU, GPU, accelerator, or any device. The requester can be associated with a processing identifier (PASID) to identify unique requesters. The requester can be executed on a server connected via host interface 1856 or a server connected via a fabric through fabric interface 1852.

Authentication and security circuitry 1804 can authenticate a requester to determine if the requester is permitted to access a region of memory managed by smart controller 1800. Smart controller 1800 can deny any memory access request or memory allocation request from any requester that is not permitted to access a requested region of memory. In some examples, authentication and security circuitry 1804 can negotiate and establish a secure connection with a requester so that memory access requests and data can be transferred using a secure connection such as TLS, IPSec, or link encryption.

Quality of service enforcement circuitry 1806 can regulate quality of service among multiple requesters so that more memory and/or more memory bandwidth can be allocated to higher priority level requesters than to lower priority level requesters. Quality of service enforcement circuitry 1806 can regulate quality of service among multiple requesters so that higher priority level requesters can receive responses to their memory access requests sooner than lower priority level requesters. In some examples, quality of service enforcement circuitry 1806 can regulate data transfer rates to be no more or no less than levels assigned to a particular priority level.

Management controller 1808 can provision, manage and monitor operation of smart controller and various memory devices. Some examples are memory allocation and assignment to one or more hosts, physical memory attribute enumeration (e.g., capacity, latency etc.), fabric-specific node configuration (e.g., IP addresses of nodes), etc.

In some examples, memory can be allocated to applications at boot time. For example, when a system powers on, an orchestrator or CXL fabric manager can configure smart controller 1800 to map a host to memory regions. The host can be allocated certain amount of addressable memory locations in local memory and FAM by a Basic Input/Output System (BIOS) or other firmware reading registers.

In some examples, a data center orchestrator can allocate virtual machines (VMs) or containers to execute on hosts. An orchestrator can distribute memory to hosts based on knowledge of memory utilized by deployed VMs. The orchestrator can increase or decrease available local memory and FAM based on deployed VMs.

In some examples, more memory can be added for access by one or more hosts. An orchestrator or CXL fabric memory can request smart controller for memory and smart controller 1800 can make more memory available for use by one or more hosts. An Orchestrator or CXL fabric manager can allocate more to the host. In some examples, memory can be removed and smart controller 1800 can reduce an amount of memory (e.g., bytes) allocated to one or more host devices.

Figure 19:
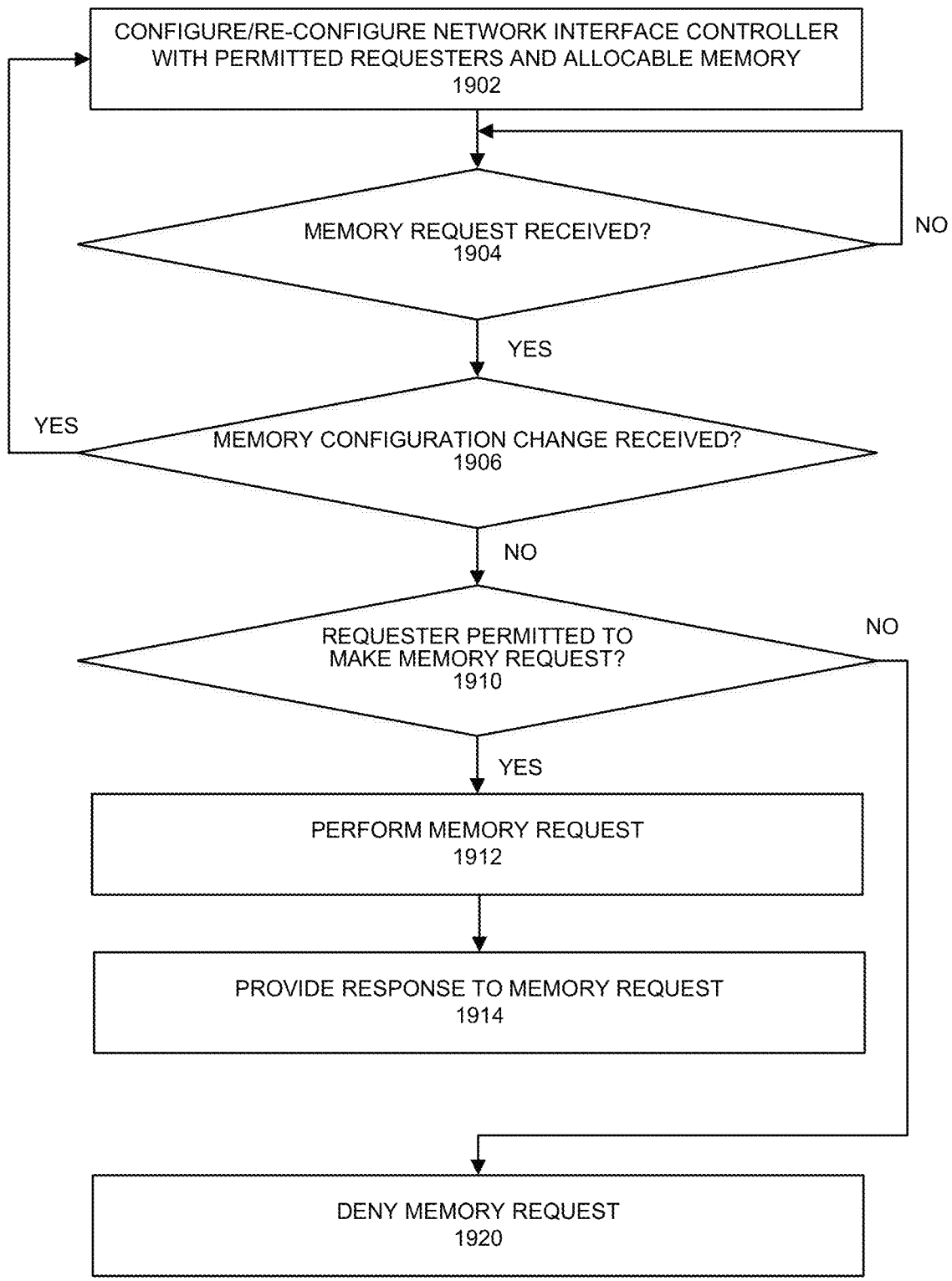
FIG. 19 depicts a process.

FIG. 19 depicts an example process. The process can be performed at least by a network interface or smart controller. At 1902, a network interface controller can be configured with permitted requesters and allocated memory devices and addresses. For example, an orchestrator or data center administrator can configure the network interface controller with available memory addresses and permitted requesters that are able to allocate use of memory addresses or an amount of memory and access memory (e.g., read, write).

At 1904, a determination can be made if a memory request is received. For example, a memory request can include a request to allocate an amount of memory from a requester or a request to access memory from a requester. If a memory request is not received, the process can repeat 1904. If a memory request is received, the process can proceed to 1906. At 1906, a determination can be made if a memory configuration change is received in the memory request from an entity permitted to change or set the memory configuration. If a memory configuration change is received, the process proceeds to 1902 to update or re-configure available memory (e.g., increase or decrease or add or remove memory devices) and/or permitted requesters (e.g., add or remove) in accordance with the memory configuration change. If a memory configuration request is not received in the memory request, the process can proceed to 1910.

At 1910, a determination can be made if a requester is permitted to make a memory request. For example, if the memory request is a memory access request, a determination can be made if the memory access request to a memory address is permitted. For example, if the memory request is a memory allocation request, a determination can be made if the memory allocation request to allocate a region of memory addresses is permitted. For example, if the memory access request or memory allocation request from the requester is permitted for the memory requested to be accessed or an amount of memory requested to be allocated or type of memory (e.g., lower latency versus higher latency) to allocate are permitted, the request can be permitted. If the memory request is permitted, the process can proceed to 1912. If the memory request is not permitted, the process can proceed to 1920.

At 1912, the network interface can perform the memory request. In a case where the memory request is a memory access request (e.g., read, write, or read-modify-write), the network interface controller can transfer the memory access request to the applicable memory device. For example, if the memory device is a locally attached device, the network interface can provide the memory access request to the memory device through a memory or device interface. Examples of memory interfaces include DDRx, CXL, PCIe and so forth. For example, if the memory device is a device accessible through a network, the network interface can transmit the memory access request to the memory device using one or more packets through a fabric or network.

If the memory request is a request to allocate memory, the network interface can allocate the requested memory up to applicable limits such as configured limitations on amount of memory, latency level of memory, and others. In some examples, the memory can be thinly provisioned. Under memory thin provisioning, physical storage resources initially allocated to application programs are less than virtual storage resources allocated to application programs or other software. Under provisioning or thin provisioning can be a memory allocation allocated to a processor (e.g., an executed a virtual execution environment or executed application) being greater than an actual amount of physical addressable memory allocated among the memory and/or the memory pool to the processor. When the physical storage resources allocated to the application programs cannot meet needs of application programs, physical storage resources are gradually added until the physical storage resources reach the virtual storage resources. An application program only needs to manage the declared virtual storage resources. Accordingly, a smaller physical storage resource may be used to support a larger virtual storage resource, thereby improving use efficiency of the physical storage resources.

At 1914, the network interface can provide a response to the memory request. If the memory request is a memory access request to a local memory device, the network interface can provide a response such as data, for a read request, or an acknowledgement of completion, for a write request. If the memory request is a memory access request to a remote memory device, the network interface can provide a response (e.g., data or acknowledgement of write completion). In cases of redirection of a memory access request received by a memory node to another memory node (such as when the receiver memory node does not include the target memory device), the network interface that received the memory request can respond to the requester (host) but wait for the response from the remote node that received the re-directed or forwarded request. For example, if A=host, B=IPU, and C=IPU, then if A sends a memory access request to B but the request can be served by C, B forwards the memory access request to C, C responds to B and B responds to A. In some examples, C could respond to A if A, B, and C are connected to the same fabric and A-C are in same trust group.

At 1920, the memory request can be denied. In some examples, an administrator or orchestrator can be informed of the declined request and the request made.

Figure 20:
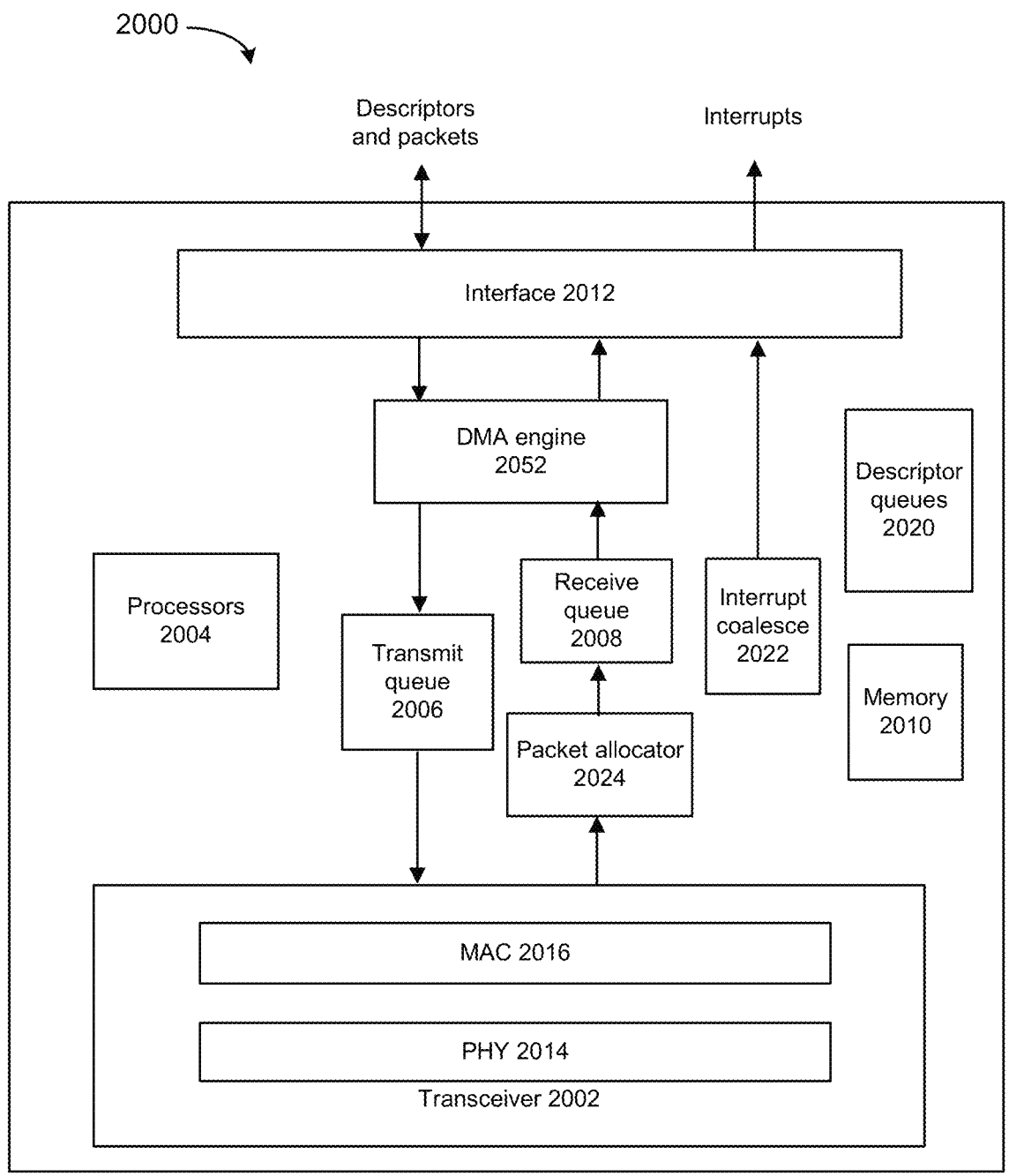
FIG. 20 depicts a network interface that can use embodiments or be used by embodiments.

FIG. 20 depicts a network interface that can use embodiments or be used by embodiments. In some embodiments, network interface an include capability to allocate memory and forward memory requests to target memory devices in accordance with embodiments described herein. In some examples, network interface 2000 can be implemented as a network interface controller, network interface card, a host fabric interface (HFI), or host bus adapter (HBA), and such examples can be interchangeable. Network interface 2000 can be coupled to one or more servers using a bus, PCIe, CXL, or DDR. Network interface 2000 may be embodied as part of a system-on-a-chip (SoC) that includes one or more processors, or included on a multichip package that also contains one or more processors.

Network interface 2000 can include transceiver 2002, processors 2004, transmit queue 2006, receive queue 2008, memory 2010, and bus interface 2012, and DMA engine 2052. Transceiver 2002 can be capable of receiving and transmitting packets in conformance with the applicable protocols such as Ethernet as described in IEEE 802.3, although other protocols may be used. Transceiver 2002 can receive and transmit packets from and to a network via a network medium (not depicted). Transceiver 2002 can include PHY circuitry 2014 and media access control (MAC) circuitry 2016. PHY circuitry 2014 can include encoding and decoding circuitry (not shown) to encode and decode data packets according to applicable physical layer specifications or standards. MAC circuitry 2016 can be configured to perform MAC address filtering on received packets, process MAC headers of received packets by verifying data integrity, remove preambles and padding, and provide packet content for processing by higher layers. MAC circuitry 2016 can be configured to assemble data to be transmitted into packets, that include destination and source addresses along with network control information and error detection hash values.

Processors 2004 can be any a combination of a: processor, core, graphics processing unit (GPU), field programmable gate array (FPGA), application specific integrated circuit (ASIC), or other programmable hardware device that allow programming of network interface 2000. For example, a "smart network interface" or SmartNIC can provide packet processing capabilities in the network interface using processors 2004. In some examples, processors 2004 can be implemented as a processor component for a SmartNIC.

Packet allocator 2024 can provide distribution of received packets for processing by multiple CPUs or cores using timeslot allocation described herein or RSS. When packet allocator 2024 uses RSS, packet allocator 2024 can calculate a hash or make another determination based on contents of a received packet to determine which CPU or core is to process a packet.

Interrupt coalesce 2022 can perform interrupt moderation whereby network interface interrupt coalesce 2022 waits for multiple packets to arrive, or for a time-out to expire, before generating an interrupt to host system to process received packet(s). Receive Segment Coalescing (RSC) can be performed by network interface 2000 whereby portions of incoming packets are combined into segments of a packet. Network interface 2000 provides this coalesced packet to an application.

Direct memory access (DMA) engine 2052 can copy a packet header, packet payload, and/or descriptor directly from host memory to the network interface or vice versa, instead of copying the packet to an intermediate buffer at the host and then using another copy operation from the intermediate buffer to the destination buffer. In some embodiments, multiple DMA engines are available for transfer of contents of packets to a destination memory associated with a host device or a destination memory associated with an accelerator device.

Memory 2010 can be any type of volatile or non-volatile memory device and can store any queue or instructions used to program network interface 2000. Transmit queue 2006 can include data or references to data for transmission by network interface. Receive queue 2008 can include data or references to data that was received by network interface from a network. Descriptor queues 2020 can include descriptors that reference data or packets in transmit queue 2006 or receive queue 2008 and corresponding destination memory regions. Bus interface 2012 can provide an interface with host device (not depicted). For example, bus interface 2012 can be compatible with PCI, PCI Express, PCI-x, Serial ATA, and/or USB compatible interface (although other interconnection standards may be used).

Figure 21:
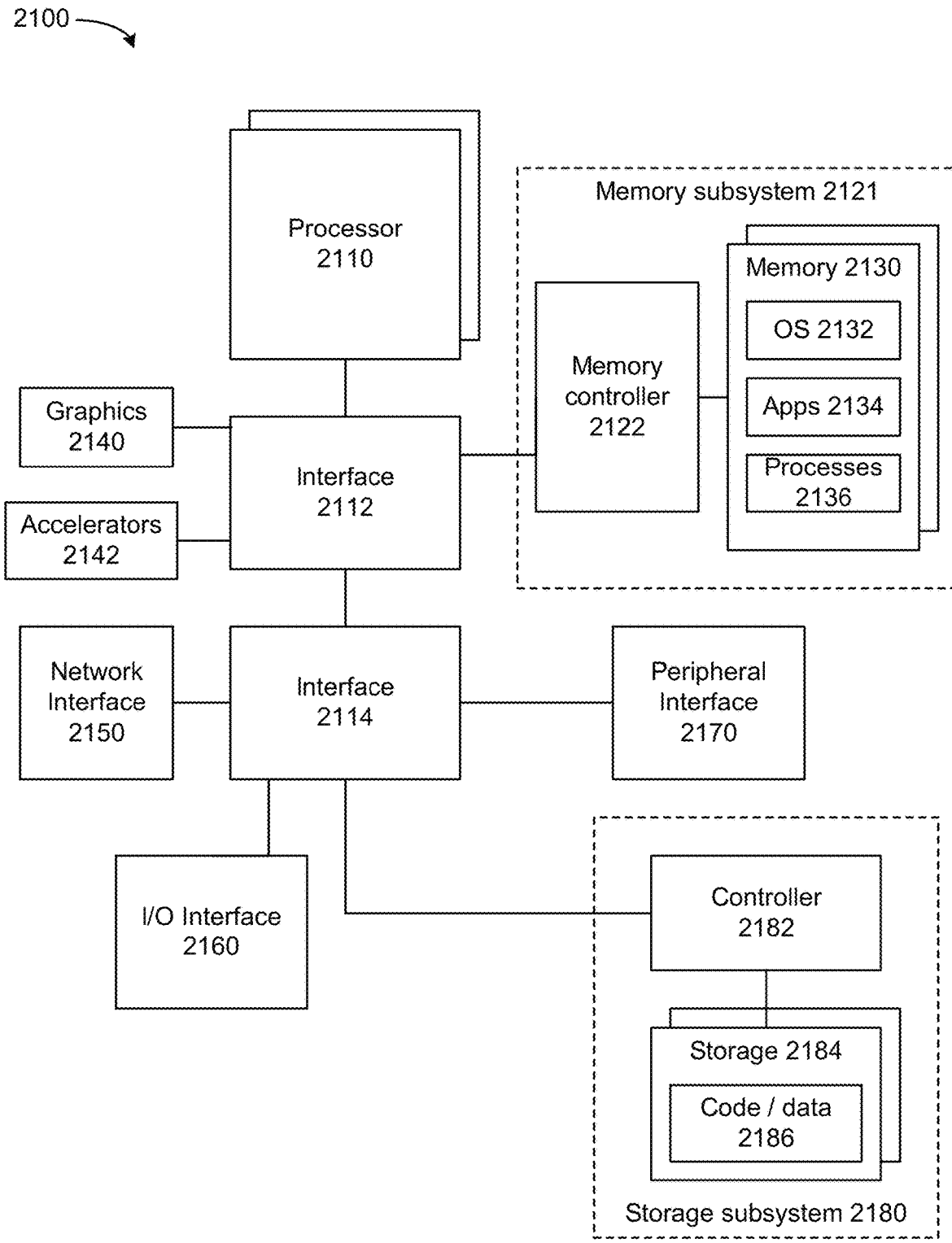
FIG. 21 depicts a system.

FIG. 21 depicts a system. The system can use embodiments described herein for processing NVMe commands. System 2100 includes processor 2110, which provides processing, operation management, and execution of instructions for system 2100. Processor 2110 can include any type of microprocessor, central processing unit (CPU), graphics processing unit (GPU), processing core, or other processing hardware to provide processing for system 2100, or a combination of processors. Processor 2110 controls the overall operation of system 2100, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 2100 includes interface 2112 coupled to processor 2110, which can represent a higher speed interface or a high throughput interface for system components that needs higher bandwidth connections, such as memory subsystem 2120, graphics interface components 2140, or accelerators 2142. Interface 2112 represents an interface circuit, which can be a standalone component or integrated onto a processor die. Where present, graphics interface 2140 interfaces to graphics components for providing a visual display to a user of system 2100. In one example, graphics interface 2140 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 2140 generates a display based on data stored in memory 2130 or based on operations executed by processor 2110 or both. In one example, graphics interface 2140 generates a display based on data stored in memory 2130 or based on operations executed by processor 2110 or both.

Accelerators 2142 can be a programmable or fixed function offload engine that can be accessed or used by a processor 2110. For example, an accelerator among accelerators 2142 can provide compression (DC) capability, cryptography services such as public key encryption (PKE), cipher, hash/authentication capabilities, decryption, or other capabilities or services. In some embodiments, in addition or alternatively, an accelerator among accelerators 2142 provides field select controller capabilities as described herein. In some cases, accelerators 2142 can be integrated into a CPU socket (e.g., a connector to a motherboard or circuit board that includes a CPU and provides an electrical interface with the CPU). For example, accelerators 2142 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs). Accelerators 2142 can provide multiple neural networks, processor cores, or graphics processing units can be made available for use by artificial intelligence (AI) or machine learning (ML) models. For example, the AI model can use or include any or a combination of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 2120 represents the main memory of system 2100 and provides storage for code to be executed by processor 2110, or data values to be used in executing a routine. Memory subsystem 2120 can include one or more memory devices 2130 such as read-only memory (ROM), flash memory, one or more varieties of random access memory (RAM) such as DRAM, or other memory devices, or a combination of such devices. Memory 2130 stores and hosts, among other things, operating system (OS) 2132 to provide a software platform for execution of instructions in system 2100. Additionally, applications 2134 can execute on the software platform of OS 2132 from memory 2130. Applications 2134 represent programs that have their own operational logic to perform execution of one or more functions. Processes 2136 represent agents or routines that provide auxiliary functions to OS 2132 or one or more applications 2134 or a combination. OS 2132, applications 2134, and processes 2136 provide software logic to provide functions for system 2100. In one example, memory subsystem 2120 includes memory controller 2122, which is a memory controller to generate and issue commands to memory 2130. It will be understood that memory controller 2122 could be a physical part of processor 2110 or a physical part of interface 2112. For example, memory controller 2122 can be an integrated memory controller, integrated onto a circuit with processor 2110.

In some examples, OS 2132 can determine a capability of a device associated with a device driver. For example, OS 2132 can receive an indication of a capability of a device (e.g., NIC 2150 or a storage configuration interface) to configure a NIC 2150 to perform memory allocation in one or more host devices or requesters in local or remote memory in accordance with embodiments described herein. OS 2132 can request a driver to enable or disable NIC 2150 to perform any of the capabilities described herein. In some examples, OS 2132, itself, can enable or disable NIC 2150 to perform any of the capabilities described herein. OS 2132 can provide requests (e.g., from an application or VM) to NIC 2150 to utilize one or more capabilities of NIC 2150. For example, any application can request use or non-use of any of capabilities described herein by NIC 2150.

While not specifically illustrated, it will be understood that system 2100 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus.

In one example, system 2100 includes interface 2114, which can be coupled to interface 2112. In one example, interface 2114 represents an interface circuit, which can include standalone components and integrated circuitry. In one example, multiple user interface components or peripheral components, or both, couple to interface 2114. Network interface 2150 provides system 2100 the ability to communicate with remote devices (e.g., servers or other computing devices) over one or more networks. Network interface 2150 can include an Ethernet adapter, wireless interconnection components, cellular network interconnection components, USB (universal serial bus), or other wired or wireless standards-based or proprietary interfaces. Network interface 2150 can transmit data to a remote device, which can include sending data stored in memory. Network interface 2150 can receive data from a remote device, which can include storing received data into memory. Various embodiments can be used in connection with network interface 2150, processor 2110, and memory subsystem 2120.

In one example, system 2100 includes one or more input/output (I/O) interface(s) 2160. I/O interface 2160 can include one or more interface components through which a user interacts with system 2100 (e.g., audio, alphanumeric, tactile/touch, or other interfacing). Peripheral interface 2170 can include any hardware interface not specifically mentioned above. Peripherals refer generally to devices that connect dependently to system 2100. A dependent connection is one where system 2100 provides the software platform or hardware platform or both on which operation executes, and with which a user interacts.

In one example, system 2100 includes storage subsystem 2180 to store data in a nonvolatile manner. In one example, in certain system implementations, at least certain components of storage 2180 can overlap with components of memory subsystem 2120. Storage subsystem 2180 includes storage device(s) 2184, which can be or include any conventional medium for storing large amounts of data in a nonvolatile manner, such as one or more magnetic, solid state, or optical based disks, or a combination. Storage 2184 holds code or instructions and data 2186 in a persistent state (e.g., the value is retained despite interruption of power to system 2100). Storage 2184 can be generically considered to be a "memory," although memory 2130 is typically the executing or operating memory to provide instructions to processor 2110. Whereas storage 2184 is nonvolatile, memory 2130 can include volatile memory (e.g., the value or state of the data is indeterminate if power is interrupted to system 2100). In one example, storage subsystem 2180 includes controller 2182 to interface with storage 2184. In one example controller 2182 is a physical part of interface 2114 or processor 2110 or can include circuits or logic in both processor 2110 and interface 2114.

A volatile memory is memory whose state (and therefore the data stored in it) is indeterminate if power is interrupted to the device. Dynamic volatile memory requires refreshing the data stored in the device to maintain state. One example of dynamic volatile memory incudes DRAM (Dynamic Random Access Memory), or some variant such as Synchronous DRAM (SDRAM). Another example of volatile memory includes cache or static random access memory (SRAM). A memory subsystem as described herein may be compatible with a number of memory technologies, such as DDR3 (Double Data Rate version 3, original release by JEDEC (Joint Electronic Device Engineering Council) on Jun. 27, 2007). DDR4 (DDR version 4, initial specification published in September 2012 by JEDEC), DDR4E (DDR version 4), LPDDR3 (Low Power DDR version3, JESD209-3B, August 2013 by JEDEC), LPDDR4) LPDDR version 4, JESD209-4, originally published by JEDEC in August 2014), WIO2 (Wide Input/output version 2, JESD229-2 originally published by JEDEC in August 2014, HBM (High Bandwidth Memory, JESD325, originally published by JEDEC in October 2013, LPDDR5 (currently in discussion by JEDEC), HBM2 (HBM version 2), currently in discussion by JEDEC, or others or combinations of memory technologies, and technologies based on derivatives or extensions of such specifications. The JEDEC standards are available at www.jedec.org.

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), Intel® Optane™ memory, NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

A power source (not depicted) provides power to the components of system 2100. More specifically, power source typically interfaces to one or multiple power supplies in system 2100 to provide power to the components of system 2100. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 2100 can be implemented using interconnected compute sleds of processors, memories, storages, network interfaces, and other components. High speed connections can be used such as: Ethernet (IEEE 802.3), remote direct memory access (RDMA), InfiniBand, Internet Wide Area RDMA Protocol (iWARP), Transmission Control Protocol (TCP), User Datagram Protocol (UDP), quick UDP Internet Connections (QUIC), RDMA over Converged Ethernet (RoCE), Peripheral Component Interconnect express (PCIe), Intel® QuickPath Interconnect (QPI), Intel® Ultra Path Interconnect (UPI), Intel® On-Chip System Fabric (IOSF), Omnipath, Compute Express Link (CXL), HyperTransport, high-speed fabric, NVLink, Advanced Microcontroller Bus Architecture (AMBA) interconnect, OpenCAPI, Gen-Z, Cache Coherent Interconnect for Accelerators (CCIX), 3GPP Long Term Evolution (LTE) (4G), 3GPP 5G, DisplayPort, embedded DisplayPort, MIPI, HDMI, Infinity Fabric (IF), and successors or variations thereof.

Embodiments herein may be implemented in various types of computing and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, each blade includes components common to conventional servers, including a main printed circuit board (main board) providing internal wiring (e.g., buses) for coupling appropriate integrated circuits (ICs) and other components mounted to the board.

In some examples, network interface and other embodiments described herein can be used in connection with a base station (e.g., 3G, 4G, 5G and so forth), macro base station (e.g., 5G networks), picostation (e.g., an IEEE 802.11 compatible access point), nanostation (e.g., for Point-to-MultiPoint (PtMP) applications), on-premises data centers, off-premises data centers, edge network elements, fog network elements, and/or hybrid data centers (e.g., data center that use virtualization, cloud and software-defined networking to deliver application workloads across physical data centers and distributed multi-cloud environments).

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. A processor can be one or more combination of a hardware state machine, digital control logic, central processing unit, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of steps may also be performed according to alternative embodiments. Furthermore, additional steps may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

Example 1 can include an apparatus comprising: a network interface controller comprising a memory interface and a network interface, the network interface controller configurable to provide access to local memory or and remote memory to a requester, wherein the network interface controller is configured with an amount of memory of different memory access speeds for allocation to one or more requesters.

Example 2 includes any example, wherein the network interface controller is to grant or deny a memory allocation request from a requester based on a configuration of an amount of memory for different memory access speeds for allocation to the requester.

Example 3 includes any example, wherein the network interface controller is to grant or deny a memory access request from a requester based on a configuration of memory allocated to the requester.

Example 4 includes any example, wherein the network interface controller is to regulate quality of service of memory access requests from requesters.

Example 5 includes any example, wherein the local memory comprises a lower latency memory technology and the remote memory comprises a higher latency memory technology.

Example 6 includes any example, wherein the local memory comprises a local memory connected to the network interface controller using a memory interface.

Example 7 includes any example, wherein the remote memory comprises a memory connected to the network interface controller using a fabric.

Example 8 includes any example, wherein the network interface controller is configured to permit memory allocation to one or more servers within a trust group.

Example 9 includes any example, comprising one or more of a server, rack, or data center and wherein the one or more of a server, rack, or data center is coupled to the network interface controller and the one or more of a server, rack, or data center is to execute a requester to request allocation of an amount of memory.

Example 10 includes any example, and includes a computer-readable medium comprising instructions stored thereon, that if executed by one or more processors, cause the one or more processors to: enable or disable a network interface to: manage access to local memory or remote memory granted to a requester, wherein the network interface is configured with an amount of memory of different memory access speeds for allocation to one or more requesters.

Example 11 includes any example, and include instructions stored thereon, that if executed by one or more processors, cause the one or more processors to: grant or deny a memory allocation request from a requester based on a configuration of an amount of memory for different memory access speeds for allocation to the requester.

Example 12 includes any example, and include instructions stored thereon, that if executed by one or more processors, cause the one or more processors to: enable or disable the network interface to regulate quality of service of memory access requests from one or more requesters.

Example 13 includes any example, wherein: the local memory comprises a local memory connected to the network interface using a memory interface and the remote memory comprises a memory connected to the network interface using a fabric.

Example 14 includes any example, and includes a method comprising: providing access to local memory or remote memory, by a network interface, to one or mor requesters, based on a configured amount of memory of different memory access speeds allocated to one or more requesters.

Example 15 includes any example, and includes granting or denying, by the network interface, a memory allocation request from a requester based on a configuration of an amount of memory for different memory access speeds for allocation to the requester.

Example 16 includes any example, and includes granting or denying, by the network interface, a memory access request from a requester based on a configuration of memory allocated to the requester.

Example 17 includes any example, and includes regulating quality of service of memory access requests from requesters.

Example 18 includes any example, wherein the local memory comprises a lower latency memory technology and the remote memory comprises a higher latency memory technology.

Example 19 includes any example, wherein the local memory comprises a memory connected to the network interface using a memory interface.

Example 20 includes any example, wherein the remote memory comprises a memory connected to the network interface using a fabric.

What is claimed is:
1. An apparatus comprising:
a network interface controller comprising a direct memory access (DMA) circuitry, a memory interface, and a network interface, the network interface controller configurable to provide access to a first memory and a second memory, wherein:
the network interface controller is configured with amounts of memory in the first memory and the second memory associated with different memory access speeds for allocation to one or more requesters based on class of service of the one or more requesters,
a first amount of memory in the first memory is associated with a first class of service and first memory access speed,
a second amount of memory in the second memory is associated with a second class of service and second memory access speed,
the first class of service is higher than the second class of service,
the first memory access speed is higher than the second memory access speed,
the network interface controller is to access the first memory using the memory interface, and
the network interface controller is to access the second memory by transmission or receipt of Ethernet packets.

2. The apparatus of claim 1, wherein the network interface controller is to grant or deny a memory allocation request from a requester based on a configuration of an amount of memory for one or more of the different memory access speeds for allocation to the requester.

3. The apparatus of claim 1, wherein the network interface controller is to grant or deny a memory access request from a requester based on a configuration of memory allocated to the requester.

4. The apparatus of claim 1, wherein the network interface controller is to regulate quality of service (QOS) of memory access requests from the one or more requesters.

5. The apparatus of claim 1, wherein the first memory comprises a lower latency memory technology than that of the second memory.

6. The apparatus of claim 1, wherein the first memory comprises a memory connected to the network interface controller using the memory interface.

7. The apparatus of claim 1, wherein the second memory comprises a memory device connected to the network interface controller using a fabric or network.

8. The apparatus of claim 1, wherein the network interface controller is permitted to configure memory allocation to the one or more requesters within a trust group and deny memory allocation to a requester outside of the trust group.

9. The apparatus of claim 1, comprising one or more of a server, rack, or data center and wherein the one or more of a server, rack, or data center is coupled to the network interface controller and the one or more of a server, rack, or data center is to execute a requester of the one or more requesters to request allocation of an amount of memory in the first memory and/or the second memory.

10. The apparatus of claim 1, wherein:
a first memory address range is associated a first latency level,
a second memory address range is associated a second latency level,
the second latency level is higher than the first latency level, and
the first memory address range is different than the second memory address range.

11. At least one non-transitory computer-readable medium comprising instructions stored thereon, that if executed by one or more processors, cause the one or more processors to:
enable or disable a network interface device to:
manage access to a first memory and a second memory granted to a requester, wherein the network interface device is configured with amounts of memory in the first memory and the second memory associated with different memory access speeds for allocation to one or more requesters based on class of service of the one or more requesters,
the network interface device comprises a direct memory access (DMA) circuitry, a memory interface, and network interface,
a first amount of memory in the first memory is associated with a first class of service and first memory access speed,
a second amount of memory in the second memory is associated with a second class of service and second memory access speed,
the first class of service is higher than the second class of service,
the first memory access speed is higher than the second memory access speed,
the network interface device is to access the first memory using the memory interface, and
the network interface device is to access the second memory by transmission or receipt of Ethernet packets.

12. The computer-readable medium of claim 11, comprising instructions stored thereon, that if executed by one or more processors, cause the one or more processors to:
grant or deny a memory allocation request from a requester based on a configuration of an amount of memory for different memory access speeds for allocation to the requester.

13. The computer-readable medium of claim 11, comprising instructions stored thereon, that if executed by one or more processors, cause the one or more processors to:
enable or disable the network interface device to regulate quality of service (QOS) of memory access requests from the one or more requesters.

14. The computer-readable medium of claim 11, wherein:
the first memory comprises a local memory connected to the network interface device using a memory interface and
the second memory comprises a memory connected to the network interface device using a fabric or network.

15. A method comprising:
a network interface device providing access to a first memory and a second memory to one or more requesters, based on configured amounts of memory of different memory access speeds allocated to one or more requesters based on class of service of the one or more requesters, wherein:
the network interface device comprises a direct memory access (DMA) circuitry, a memory interface, and network interface,
a first amount of memory in the first memory is associated with a first class of service and first memory access speed,
a second amount of memory in the second memory is associated with a second class of service and second memory access speed,
the first class of service is higher than the second class of service,
the first memory access speed is higher than the second memory access speed,
the network interface device accesses the first memory using the memory interface, and the network interface device accesses the second memory by transmission or receipt of Ethernet packets.

16. The method of claim 15, comprising:

granting or denying, by the network interface device, a memory allocation request from a requester of the one or more requesters based on a configuration of an amount of memory for one or more of the different memory access speeds for allocation to the requester.

17. The method of claim 15, comprising:

granting or denying, by the network interface device, a memory access request from a requester of the one or more requesters based on a configuration of memory allocated to the requester.

18. The method of claim 15, comprising:

regulating quality of service of memory access requests from the one or more requesters.

19. The method of claim 15, wherein the first memory comprises a lower latency memory technology than that of the second memory.

20. The method of claim 15, wherein the second memory comprises a memory connected to the network interface device using a fabric or network.

* * * * *